United States Patent
Basallo et al.

(10) Patent No.: US 10,549,199 B2
(45) Date of Patent: Feb. 4, 2020

(54) GAMING SYSTEM AND METHOD PROVIDING ONE OF A PLURALITY OF DIFFERENT VERSIONS OF A GAME BASED ON A PLAYER SELECTED SKILL LEVEL

(71) Applicant: IGT, Las Vegas, NV (US)

(72) Inventors: Leandro Basallo, San Francisco, CA (US); Timothy L. Isaacson, Sunnyvale, CA (US)

(73) Assignee: IGT, Las Vegas, NV (US)

( * ) Notice: Subject to any disclaimer, the term of this patent is extended or adjusted under 35 U.S.C. 154(b) by 18 days.

(21) Appl. No.: 15/385,445

(22) Filed: Dec. 20, 2016

(65) Prior Publication Data

US 2017/0100672 A1    Apr. 13, 2017

Related U.S. Application Data

(63) Continuation of application No. 13/626,629, filed on Sep. 25, 2012, now Pat. No. 9,530,281.

(51) Int. Cl.
  *A63F 13/67*  (2014.01)
  *G07F 17/32*  (2006.01)
  *A63F 13/837* (2014.01)

(52) U.S. Cl.
  CPC ............ *A63F 13/67* (2014.09); *A63F 13/837* (2014.09); *G07F 17/3262* (2013.01); *G07F 17/3288* (2013.01)

(58) Field of Classification Search
  CPC ............ G07F 17/3267; G07F 17/3262; G07F 17/3286; G07F 17/3227
  See application file for complete search history.

(56) References Cited

U.S. PATENT DOCUMENTS 4,621,814 A   11/1986   Stepan et al.
4,838,552 A    6/1989   Hagiwara
(Continued)

FOREIGN PATENT DOCUMENTS

GB   2072395   9/1981

OTHER PUBLICATIONS

Screenshots of "Angel or Devil" Online Slot Game, available at http://online.casinocity.com/slots/game/angel-or-devil/, printed on Sep. 26, 2012 (7 pages).
(Continued)

*Primary Examiner* — Omkar A Deodhar
*Assistant Examiner* — Eric M Thomas
(74) *Attorney, Agent, or Firm* — Neal, Gerber & Eisenberg LLP

(57) ABSTRACT

Various embodiments of the present disclosure provide a gaming system and method providing one of a plurality of different versions of a game based on a player selected skill level. The gaming system displays an indication of a plurality of different skill levels. Each of the skill levels is associated with a different version of a game. The gaming system receives a player selection of one of the skill levels, displays a play of the version of the game associated with the selected skill level, and determines an outcome for the play. If the selected skill level is a designated skill level, the gaming system randomly determines the outcome. If the selected skill level is greater than the designated skill level, the gaming system receives a quantifiable skill input from the player in association with the play, and determines the outcome based in part on the received quantifiable skill input.

20 Claims, 29 Drawing Sheets

(56) References Cited

U.S. PATENT DOCUMENTS

| | | |
|---|---|---|
| 4,874,173 A | 10/1989 | Kishishita et al. |
| 5,152,529 A | 10/1992 | Okada |
| 5,342,047 A | 8/1994 | Heidel |
| 5,342,049 A | 8/1994 | Wichinsky et al. |
| 5,393,061 A | 2/1995 | Manship et al. |
| 5,395,111 A | 3/1995 | Inoue |
| 5,569,084 A | 10/1996 | Nicastro et al. |
| 5,584,764 A | 12/1996 | Inoue |
| 5,609,524 A | 3/1997 | Inoue et al. |
| 5,697,843 A | 12/1997 | Manship et al. |
| 5,704,835 A | 1/1998 | Dietz |
| 5,722,891 A | 3/1998 | Inoue |
| 5,775,692 A | 7/1998 | Watts et al. |
| 5,890,962 A | 4/1999 | Takemoto et al. |
| 5,947,820 A | 9/1999 | Morro et al. |
| 5,984,782 A | 11/1999 | Inoue |
| 6,050,895 A | 4/2000 | Luciano et al. |
| 6,089,976 A | 7/2000 | Schneider et al. |
| 6,186,894 B1 | 2/2001 | Mayeroff |
| 6,210,279 B1 | 4/2001 | Dickinson |
| 6,227,971 B1 | 5/2001 | Weiss |
| 6,267,669 B1 | 7/2001 | Luciano, Jr. et al. |
| 6,270,412 B1 | 8/2001 | Crawford et al. |
| 6,312,334 B1 | 11/2001 | Yoseloff |
| 6,315,666 B1 | 11/2001 | Mastera et al. |
| 6,375,187 B1 | 4/2002 | Baerlocher |
| 6,413,160 B1 | 7/2002 | Vancura |
| 6,413,162 B1 | 7/2002 | Baerlocher et al. |
| 6,494,785 B1 | 12/2002 | Gerrard et al. |
| 6,506,118 B1 | 1/2003 | Baerlocher et al. |
| 6,514,141 B1 | 2/2003 | Kaminkow et al. |
| 6,569,015 B1 | 5/2003 | Baerlocher et al. |
| 6,572,473 B1 | 6/2003 | Baerlocher |
| 6,599,192 B1 | 7/2003 | Baerlocher et al. |
| 6,632,141 B2 | 10/2003 | Webb et al. |
| 6,648,754 B2 | 11/2003 | Baerlocher et al. |
| 6,666,765 B2 | 12/2003 | Vancura |
| 6,692,355 B2 | 2/2004 | Baerlocher et al. |
| 6,719,632 B2 | 4/2004 | Palmer et al. |
| 6,722,981 B2 | 4/2004 | Kaminkow et al. |
| 6,722,982 B2 | 4/2004 | Kaminkow et al. |
| 6,726,565 B2 | 4/2004 | Hughs-Baird |
| 6,746,016 B2 | 6/2004 | Perrie et al. |
| 6,752,717 B2 | 6/2004 | Vancura |
| 6,758,750 B2 | 7/2004 | Baerlocher et al. |
| 6,761,632 B2 | 7/2004 | Bansemer et al. |
| 6,767,284 B1 | 7/2004 | Koza |
| 6,780,103 B2 | 8/2004 | Bansemer et al. |
| 6,786,820 B2 | 9/2004 | Gerrard et al. |
| 6,793,579 B2 | 9/2004 | Baerlocher et al. |
| 6,796,905 B2 | 9/2004 | Baerlocher et al. |
| 6,808,452 B2 | 10/2004 | Baerlocher et al. |
| 6,808,454 B2 | 10/2004 | Gerrard et al. |
| 6,811,483 B1 | 11/2004 | Webb et al. |
| 6,832,957 B2 | 12/2004 | Falconer |
| 6,837,788 B2 | 1/2005 | Cannon |
| 6,852,027 B2 | 2/2005 | Kaminkow |
| 6,852,030 B2 | 2/2005 | Baerlocher |
| 6,860,810 B2 | 3/2005 | Cannon |
| 6,863,606 B1 | 3/2005 | Berg et al. |
| 6,890,257 B2 | 5/2005 | Baerlocher |
| 6,899,623 B2 | 5/2005 | Baerlocher |
| 6,918,830 B2 | 7/2005 | Baerlocher |
| 6,942,566 B2 | 9/2005 | Baerlocher et al. |
| 6,942,567 B2 | 9/2005 | Baerlocher et al. |
| 6,942,568 B2 | 9/2005 | Baerlocher |
| 6,960,132 B2 | 11/2005 | Baerlocher et al. |
| 6,966,833 B2 | 11/2005 | Kaminkow et al. |
| 6,971,953 B2 | 12/2005 | Gerrard et al. |
| 6,984,174 B2 | 1/2006 | Cannon et al. |
| 6,988,732 B2 | 1/2006 | Vancura |
| 7,001,273 B2 | 2/2006 | Baerlocher |
| 7,029,395 B1 | 4/2006 | Baerlocher |
| 7,040,984 B2 | 5/2006 | Mead |
| 7,056,210 B2 | 6/2006 | Bansemer et al. |
| 7,073,793 B2 | 7/2006 | Vancura |
| 7,077,744 B2 | 7/2006 | Cannon |
| 7,160,186 B2 | 1/2007 | Cuddy et al. |
| 7,175,521 B2 | 2/2007 | McClintic |
| 7,175,524 B2 | 2/2007 | Bansemer et al. |
| 7,192,349 B2 | 3/2007 | Baerlocher et al. |
| 7,217,187 B2 | 5/2007 | Vancura |
| 7,234,700 B2 | 6/2007 | Vancura |
| 7,235,010 B2 | 6/2007 | Baerlocher |
| 7,250,001 B2 | 7/2007 | Baerlocher et al. |
| 7,264,545 B2 | 9/2007 | Maya et al. |
| 7,270,604 B2 | 9/2007 | Gerrard et al. |
| 7,326,114 B2 | 2/2008 | Webb et al. |
| 7,326,115 B2 | 2/2008 | Baerlocher |
| 7,329,179 B2 | 2/2008 | Baerlocher |
| 7,331,864 B2 | 2/2008 | Baerlocher |
| 7,351,146 B2 | 4/2008 | Kaminkow |
| 7,364,507 B2 | 4/2008 | Baerlocher et al. |
| 7,387,570 B2 | 6/2008 | Randall |
| 7,407,435 B2 | 8/2008 | Baerlocher et al. |
| 7,452,270 B2 | 11/2008 | Walker et al. |
| 7,465,227 B2 | 12/2008 | Baerlocher |
| 7,470,184 B2 | 12/2008 | Baerlocher et al. |
| 7,470,185 B2 | 12/2008 | Baerlocher |
| 7,488,251 B2 | 2/2009 | Kaminkow |
| 7,513,828 B2 | 4/2009 | Nguyen et al. |
| 7,566,272 B2 | 7/2009 | Gerrard et al. |
| 7,572,182 B2 | 8/2009 | Vancura |
| 7,572,184 B2 | 8/2009 | Baerlocher et al. |
| 7,591,726 B2 | 9/2009 | Baerlocher et al. |
| 7,594,851 B2 | 9/2009 | Falconer |
| 7,601,057 B2 | 10/2009 | Kaminkow |
| 7,625,282 B2 | 12/2009 | Baerlocher et al. |
| 7,658,673 B2 | 2/2010 | Baerlocher et al. |
| 7,666,086 B2 | 2/2010 | Baerlocher |
| 7,666,087 B2 | 2/2010 | Hughs-Baird |
| 7,686,303 B2 | 3/2010 | Kaminkow et al. |
| 7,699,698 B2 | 4/2010 | Randall |
| 7,722,451 B2 | 5/2010 | Hughs-Baird et al. |
| 7,722,463 B2 | 5/2010 | Maya et al. |
| 7,731,582 B2 | 6/2010 | Randall et al. |
| 7,749,068 B2 | 7/2010 | Cuddy et al. |
| 7,758,416 B2 | 7/2010 | Randall |
| 7,785,195 B2 | 8/2010 | Palmer et al. |
| 7,789,743 B2 | 9/2010 | Walker et al. |
| 7,789,749 B2 | 9/2010 | Bansemer et al. |
| 7,794,316 B2 | 9/2010 | Palmer et al. |
| 7,819,744 B2 | 10/2010 | Hughs-Baird |
| 7,828,643 B2 | 11/2010 | Baerlocher |
| 7,837,547 B2 | 11/2010 | Cannon |
| 7,846,015 B2 | 12/2010 | Bansemer et al. |
| 7,846,018 B2 | 12/2010 | Baerlocher |
| 7,850,522 B2 | 12/2010 | Walker et al. |
| 7,867,077 B2 | 1/2011 | Baerlocher et al. |
| 7,887,412 B2 | 2/2011 | Baerlocher |
| 7,901,287 B2 | 3/2011 | Simms et al. |
| 7,905,771 B2 | 3/2011 | Walker et al. |
| 7,905,772 B2 | 3/2011 | Baerlocher et al. |
| 7,905,774 B2 | 3/2011 | Walker et al. |
| 7,914,372 B2 | 3/2011 | Tessmer et al. |
| 7,931,531 B2 | 4/2011 | Oberberger |
| 7,950,993 B2 | 5/2011 | Oberberger |
| 7,963,842 B2 | 6/2011 | Ruymann |
| 7,967,674 B2 | 6/2011 | Baerlocher |
| 7,976,378 B2 | 7/2011 | Baerlocher |
| 8,016,657 B2 | 9/2011 | Walker et al. |
| 8,020,866 B2 | 9/2011 | Walker et al. |
| 8,066,564 B2 | 11/2011 | Randall |
| 8,087,999 B2 | 1/2012 | Oberberger et al. |
| 8,157,633 B2 | 4/2012 | Kaminkow |
| 8,197,335 B2 | 6/2012 | DeWaal et al. |
| 8,235,804 B2 | 8/2012 | Gagner et al. |
| 2003/0013519 A1 | 1/2003 | Bennett |
| 2004/0048644 A1 | 3/2004 | Gerrard et al. |
| 2004/0116173 A1 | 6/2004 | Baerlocher |
| 2005/0181853 A1 | 8/2005 | Baerlocher |
| 2005/0282625 A1 | 12/2005 | Nicely |
| 2006/0030399 A1 | 2/2006 | Baerlocher |
| 2006/0172791 A1 | 8/2006 | Wolf |

(56) References Cited

U.S. PATENT DOCUMENTS

| | | |
|---|---|---|
| 2006/0247029 A1 | 11/2006 | Walker et al. |
| 2007/0129128 A1 | 6/2007 | McClintic |
| 2007/0135208 A1* | 6/2007 | Betteridge, IV ........ G07F 17/32 463/25 |
| 2007/0167210 A1* | 7/2007 | Kelly ...................... G07F 17/32 463/16 |
| 2008/0076501 A1 | 3/2008 | Mares et al. |
| 2008/0076515 A1* | 3/2008 | Baerlocher ............. G07F 17/32 463/20 |
| 2008/0102916 A1 | 5/2008 | Kovacs et al. |
| 2008/0102934 A1 | 5/2008 | Tan |
| 2008/0113759 A1 | 5/2008 | Baerlocher |
| 2008/0132320 A1 | 6/2008 | Rodgers |
| 2008/0153570 A1* | 6/2008 | Esses .................. G07F 17/3244 463/20 |
| 2008/0182650 A1 | 7/2008 | Randall et al. |
| 2008/0182655 A1 | 7/2008 | DeWaal et al. |
| 2008/0248865 A1 | 10/2008 | Tedesco et al. |
| 2008/0254893 A1* | 10/2008 | Patel .................. G07F 17/3267 463/42 |
| 2008/0261680 A1 | 10/2008 | Buecheler et al. |
| 2008/0311980 A1 | 12/2008 | Cannon |
| 2008/0318668 A1 | 12/2008 | Ching et al. |
| 2009/0042652 A1 | 2/2009 | Baerlocher et al. |
| 2009/0069073 A1 | 3/2009 | Gerrard et al. |
| 2009/0098933 A1 | 4/2009 | Walker et al. |
| 2009/0111573 A1 | 4/2009 | Iddings |
| 2009/0143133 A1 | 6/2009 | Baerlocher |
| 2010/0120506 A1 | 5/2010 | Davis et al. |
| 2010/0124969 A1 | 5/2010 | Hughes et al. |
| 2010/0234086 A1 | 9/2010 | Michaelson |
| 2010/0261518 A1 | 10/2010 | Randall |
| 2010/0267441 A1 | 10/2010 | Baerlocher |
| 2011/0053676 A1 | 3/2011 | Wolf et al. |
| 2011/0070946 A1 | 3/2011 | Baerlocher et al. |
| 2011/0111820 A1 | 5/2011 | Filipour et al. |
| 2011/0111824 A1 | 5/2011 | Cuddy et al. |
| 2011/0111841 A1 | 5/2011 | Tessmer et al. |
| 2011/0117999 A1 | 5/2011 | Anderson et al. |
| 2011/0118011 A1 | 5/2011 | Filipour et al. |
| 2011/0124396 A1 | 5/2011 | Walker et al. |
| 2011/0124402 A1 | 5/2011 | De Waal et al. |
| 2011/0201413 A1 | 8/2011 | Oberberger |
| 2011/0218024 A1 | 9/2011 | Baerlocher |
| 2012/0040739 A1 | 2/2012 | Randall |
| 2012/0184356 A1 | 7/2012 | Kaminkow |
| 2012/0184357 A1 | 7/2012 | Kaminkow |

OTHER PUBLICATIONS

"Battleship—Search & Destroy" Brochure, Copyright 2010 to IGT, available at http://media.igt.com/marketing/PromotionalLiterature/GamePromoLit_ia_158.pdf (2 pages).

* cited by examiner

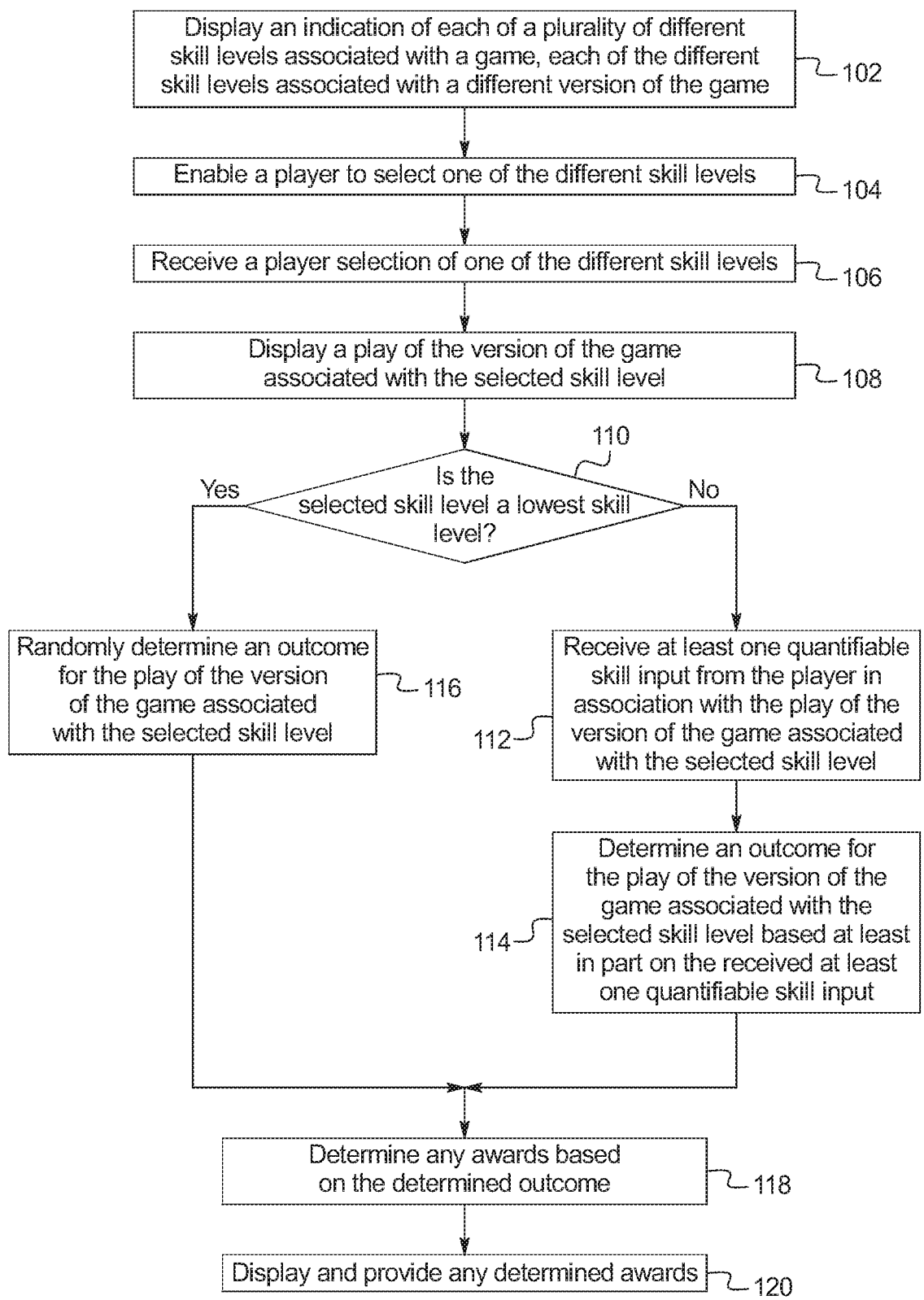

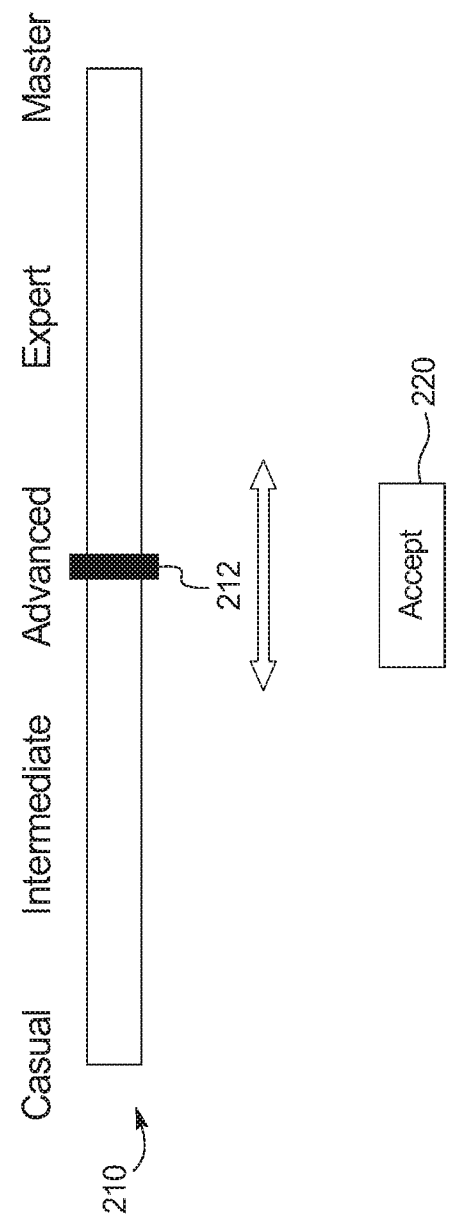

Press Your Luck or Test Your Skill

Casual   Intermediate   Advanced   Expert   Master

You selected the Casual skill level.
Please wait for your play of the bonus game to begin.

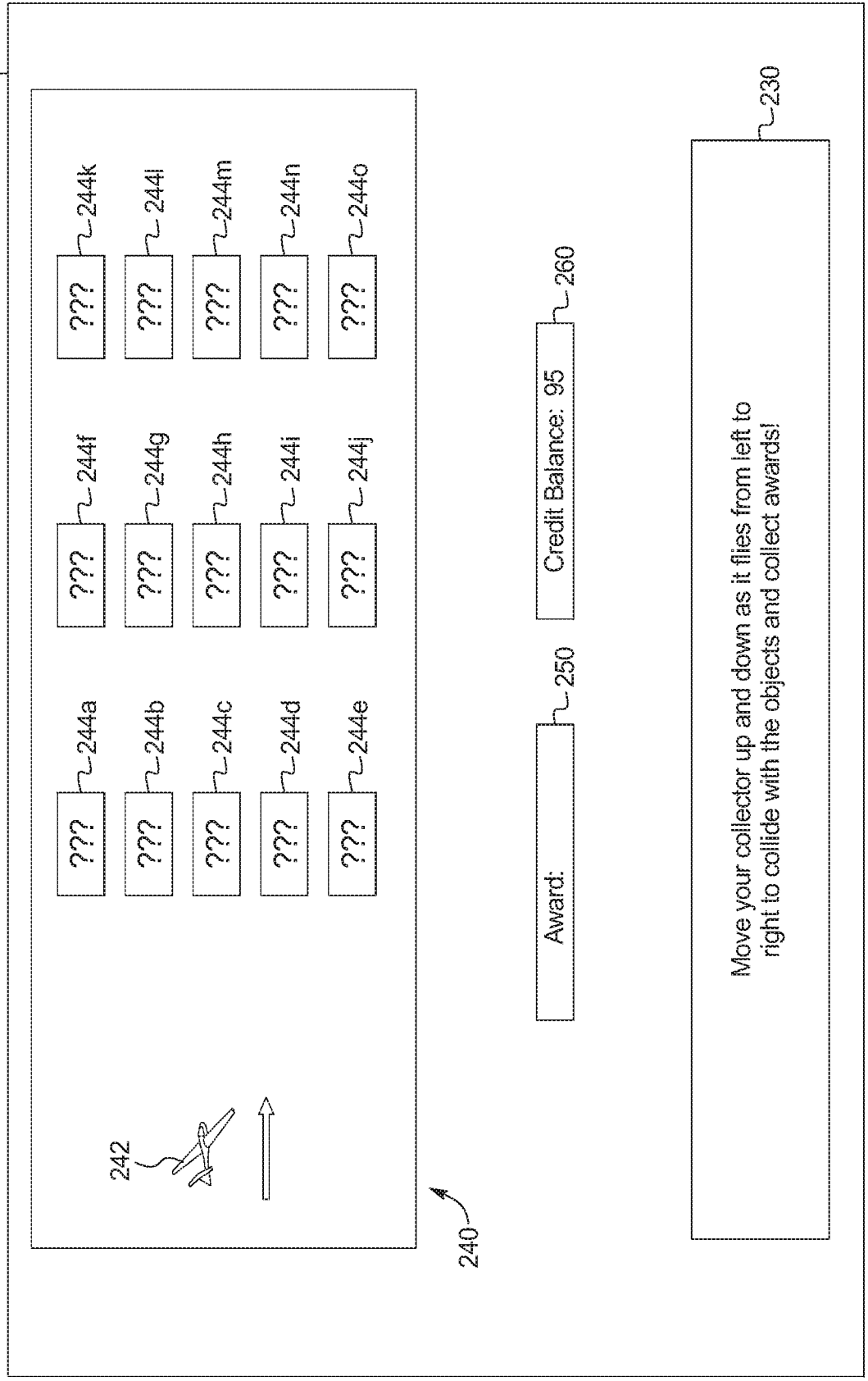

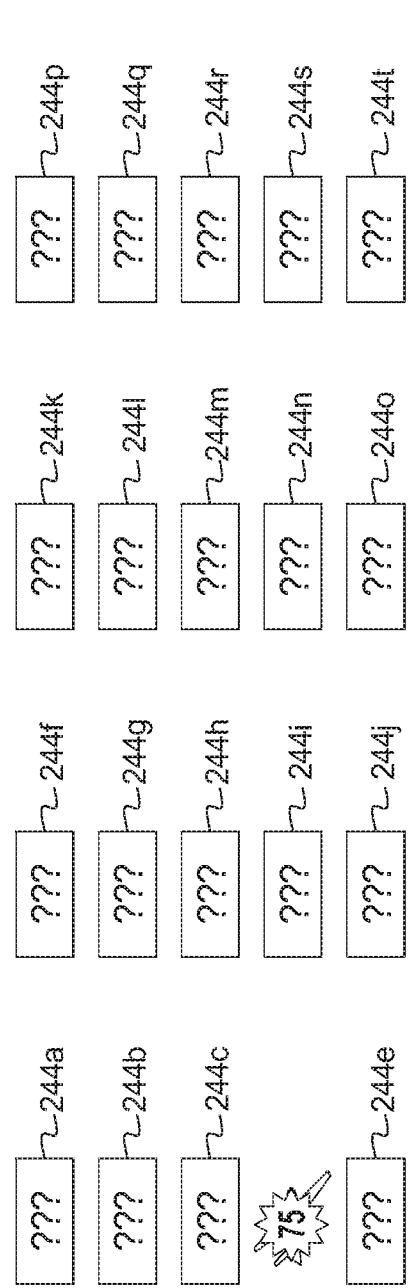

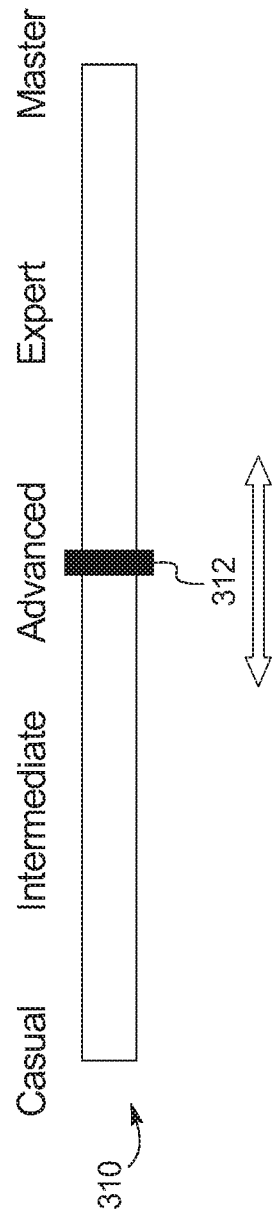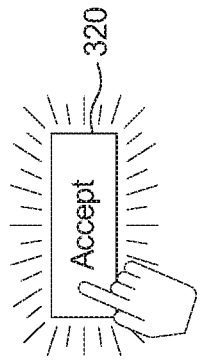
FIG. 3A
Press Your Luck or Test Your Skill
Casual  Intermediate  Advanced  Expert  Master
You selected the Advanced skill level.
Please wait for your play of the bonus game to begin.

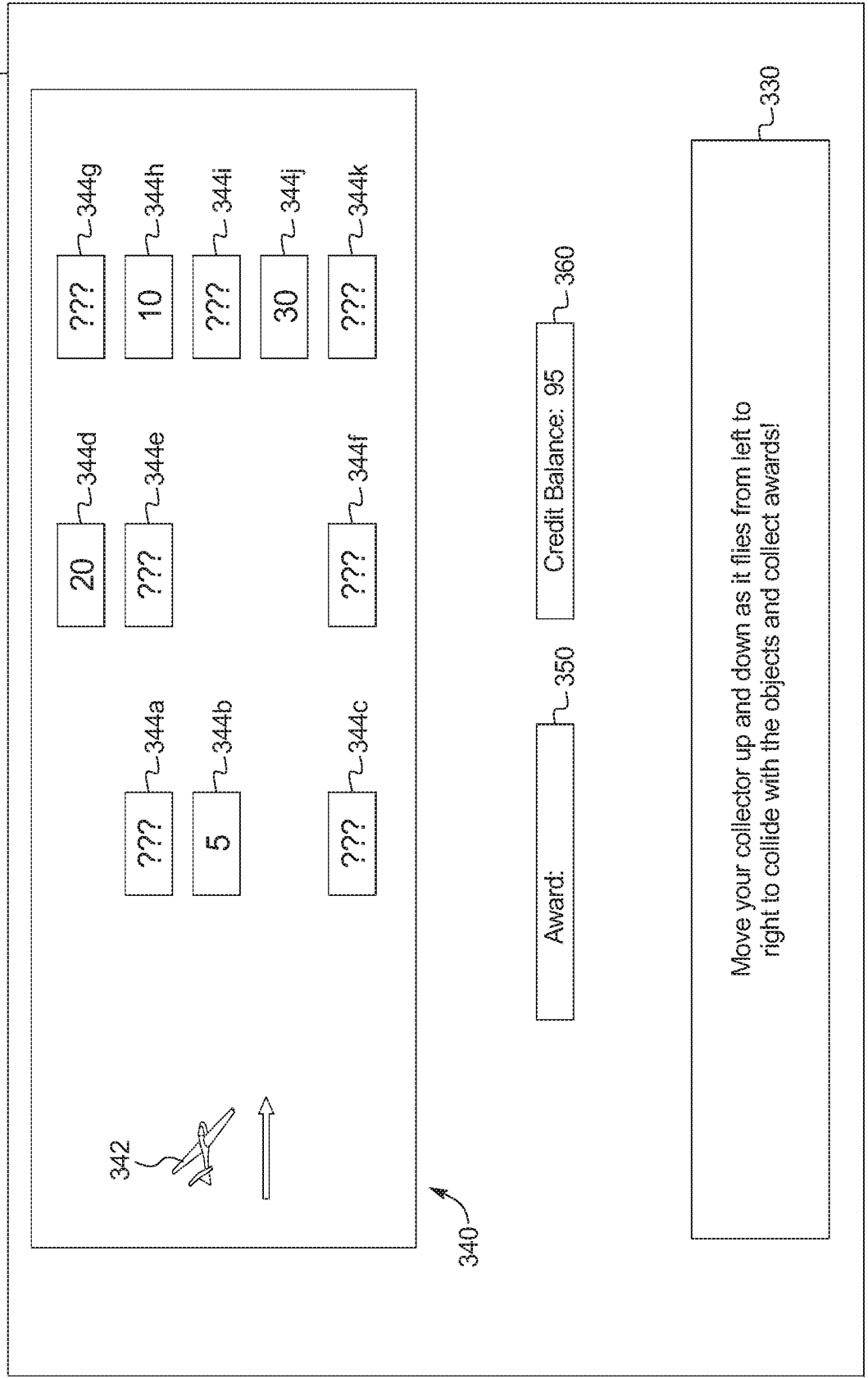

Press Your Luck or Test Your Skill

Casual    Intermediate    Advanced    Expert    Master

You selected the Master skill level.
Please wait for your play of the bonus game to begin.

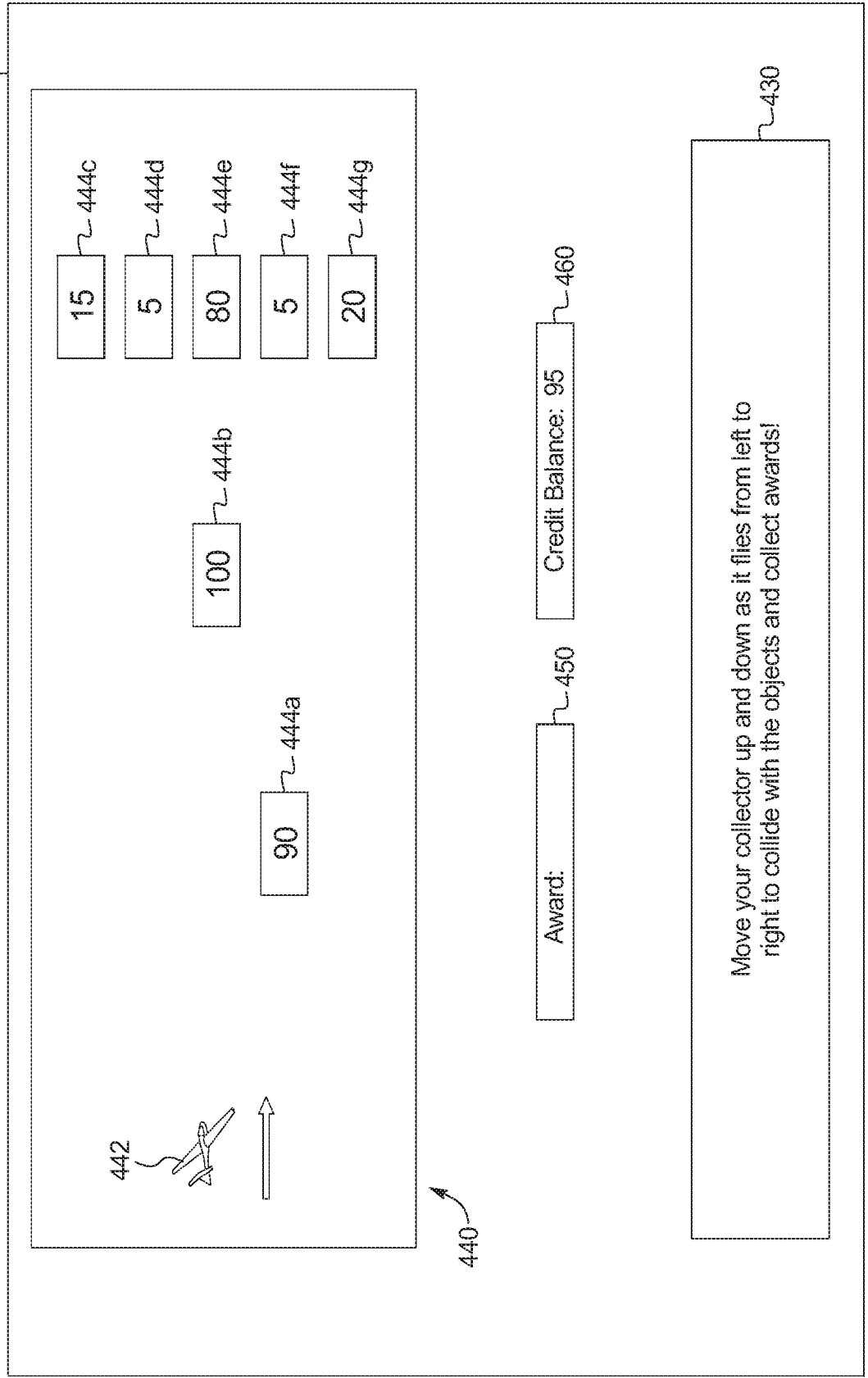

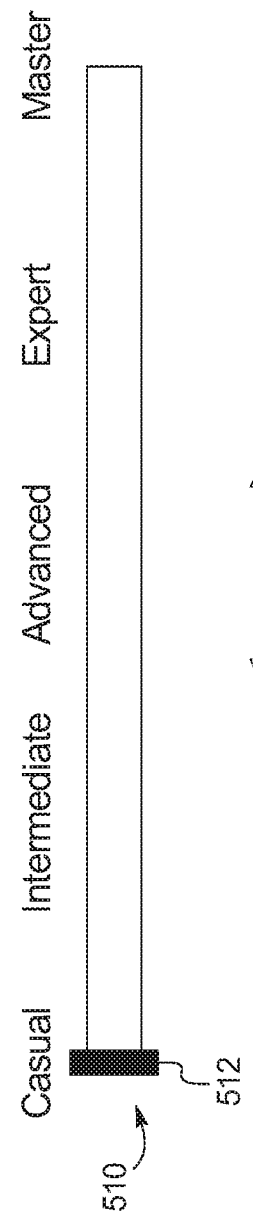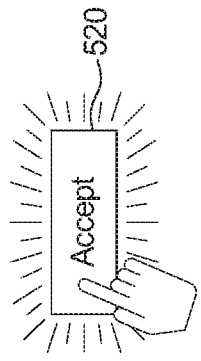

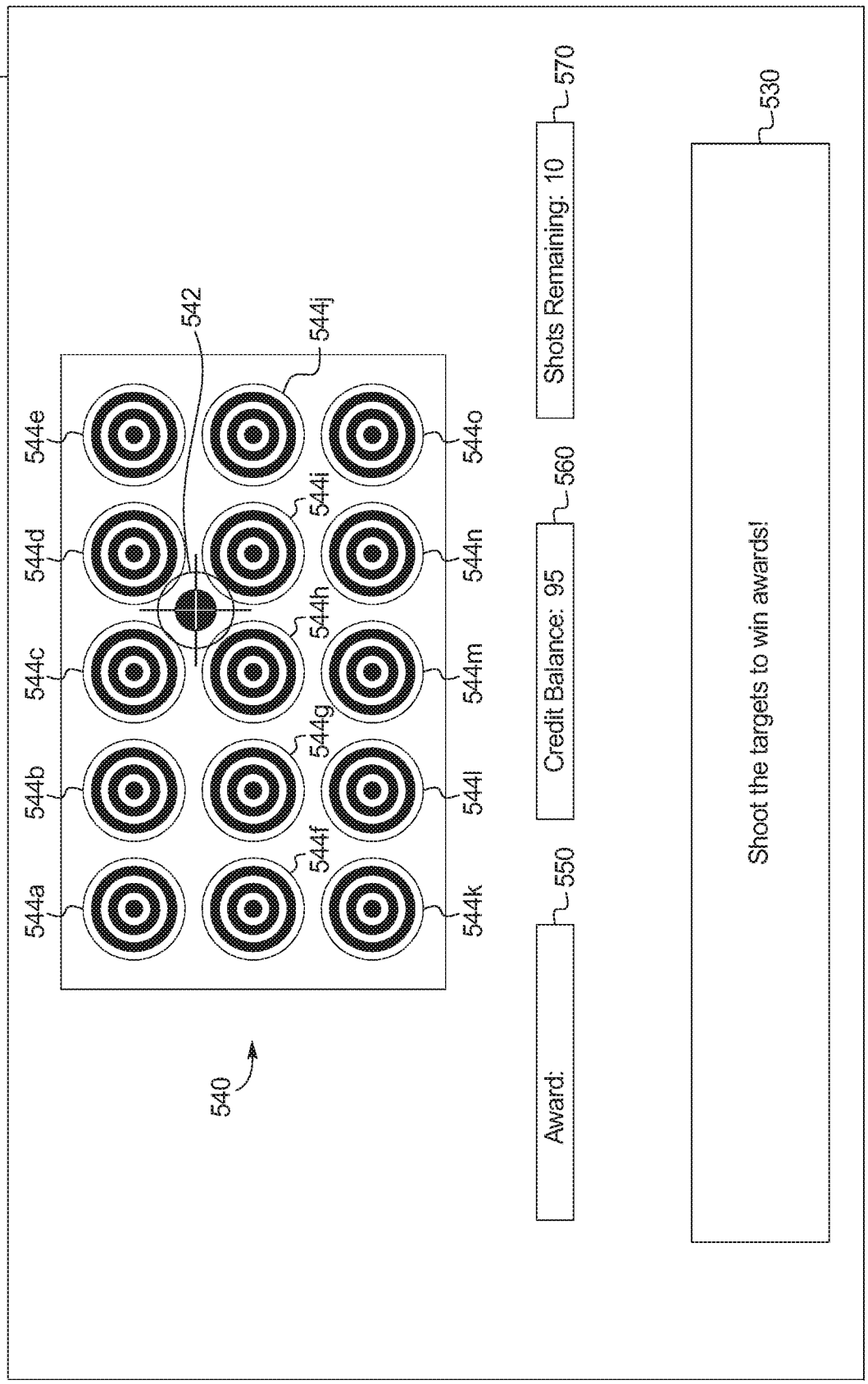

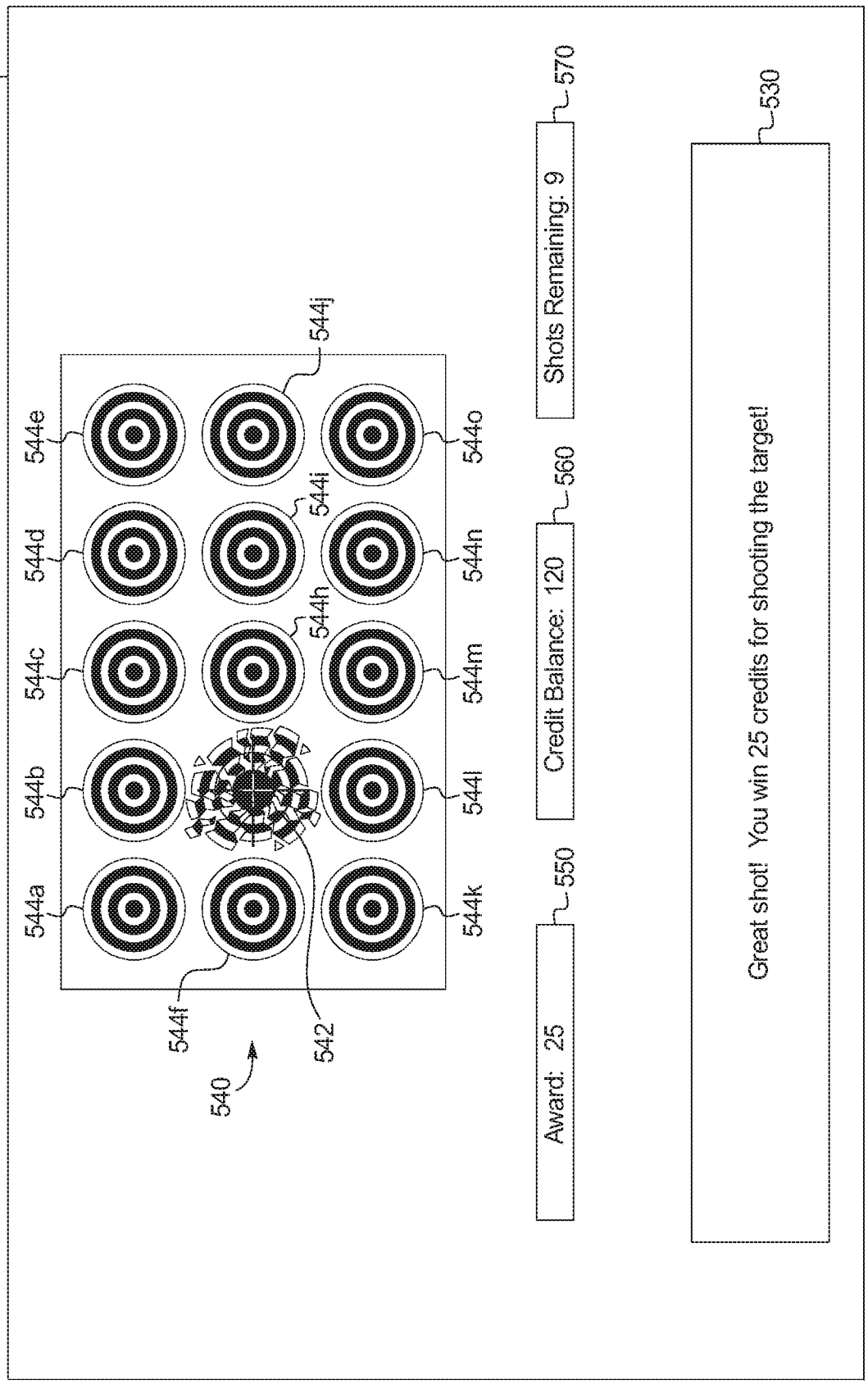

FIG. 6A
Press Your Luck or Test Your Skill
Casual   Intermediate   Advanced   Expert   Master
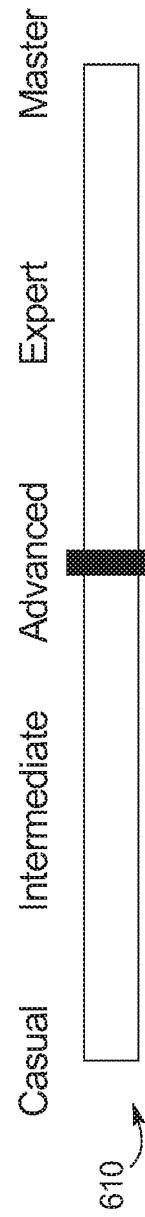
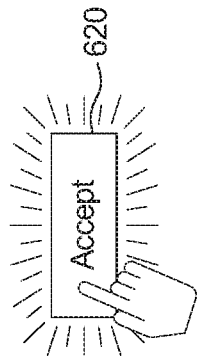
You selected the Advanced skill level.
Please wait for your play of the bonus game to begin.

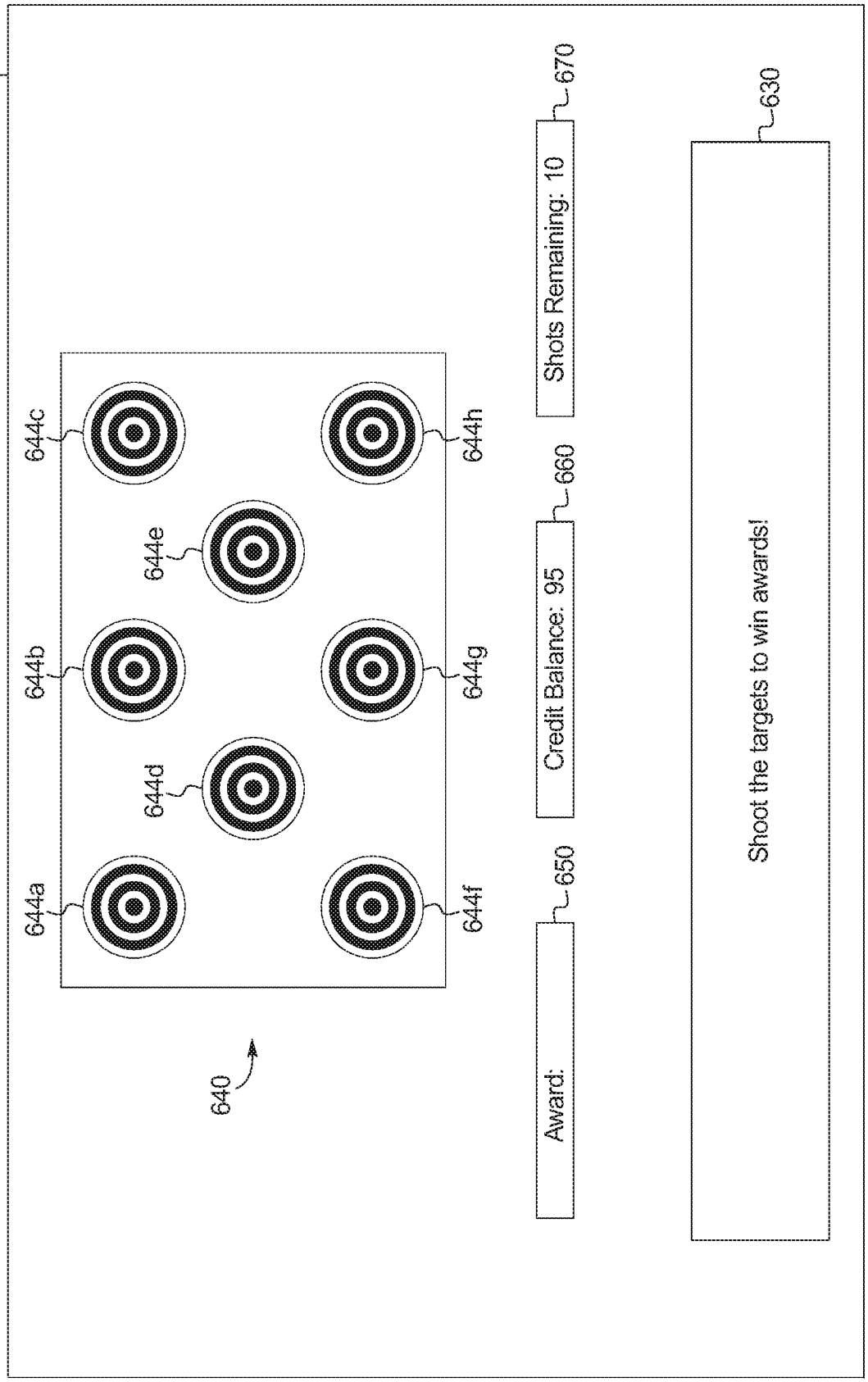

FIG. 7A
Press Your Luck or Test Your Skill
Casual   Intermediate   Advanced   Expert   Master
712
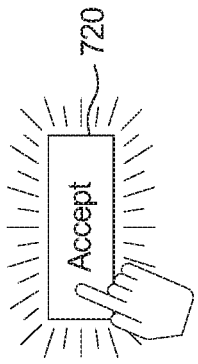
720
710
730
You selected the Master skill level.
Please wait for your play of the bonus game to begin.
1116, 1118

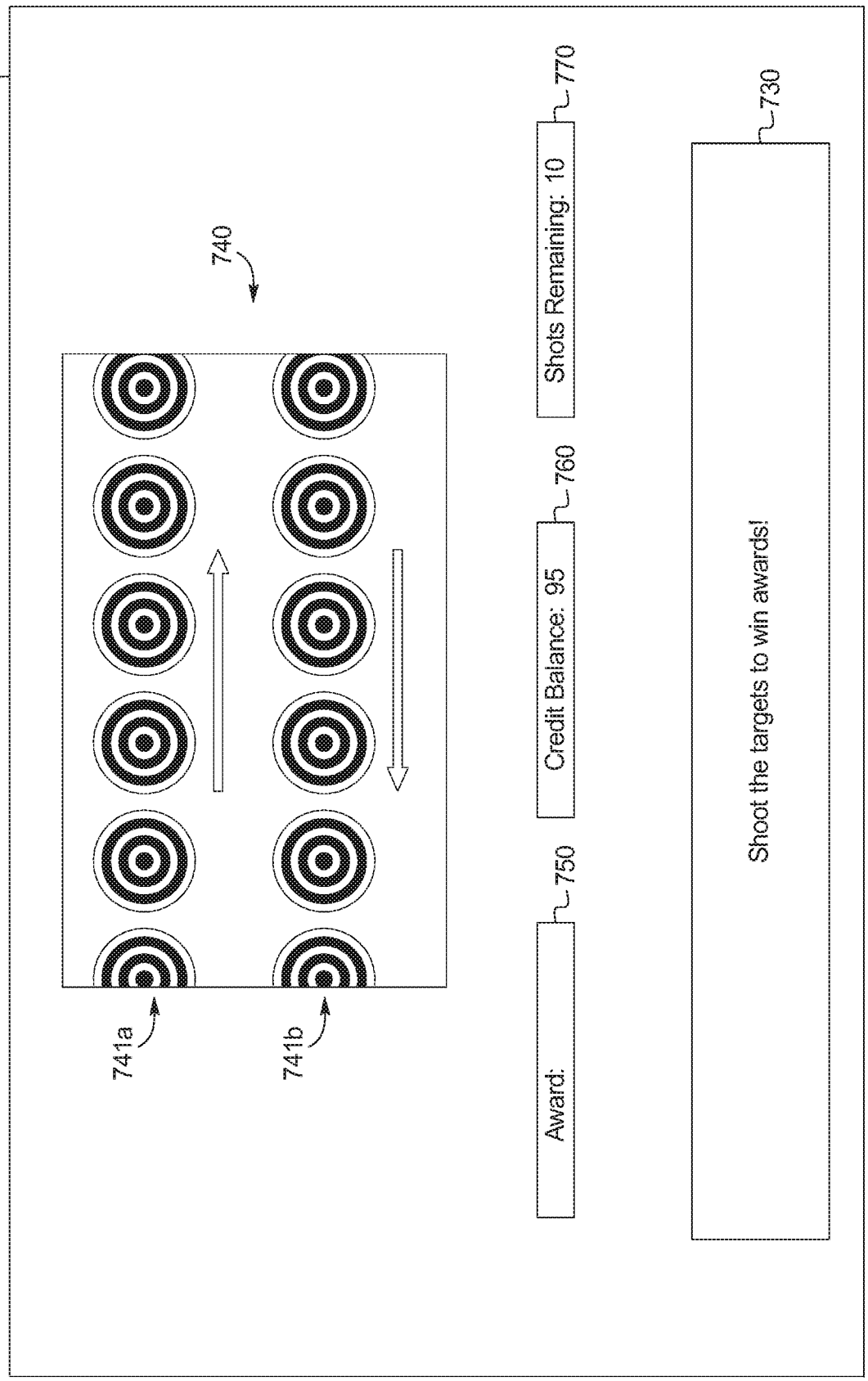

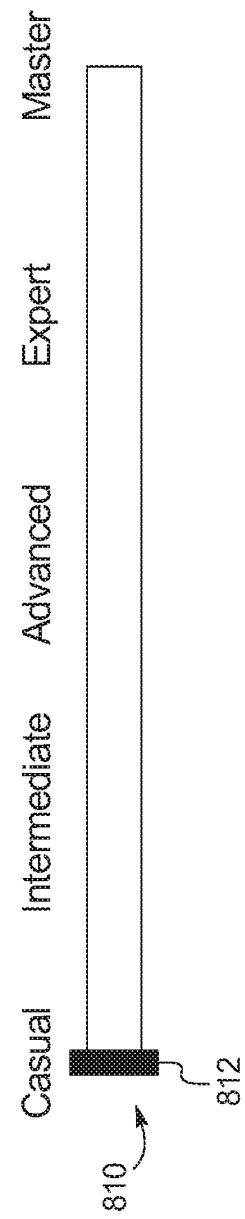
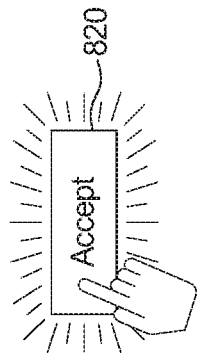
FIG. 8A

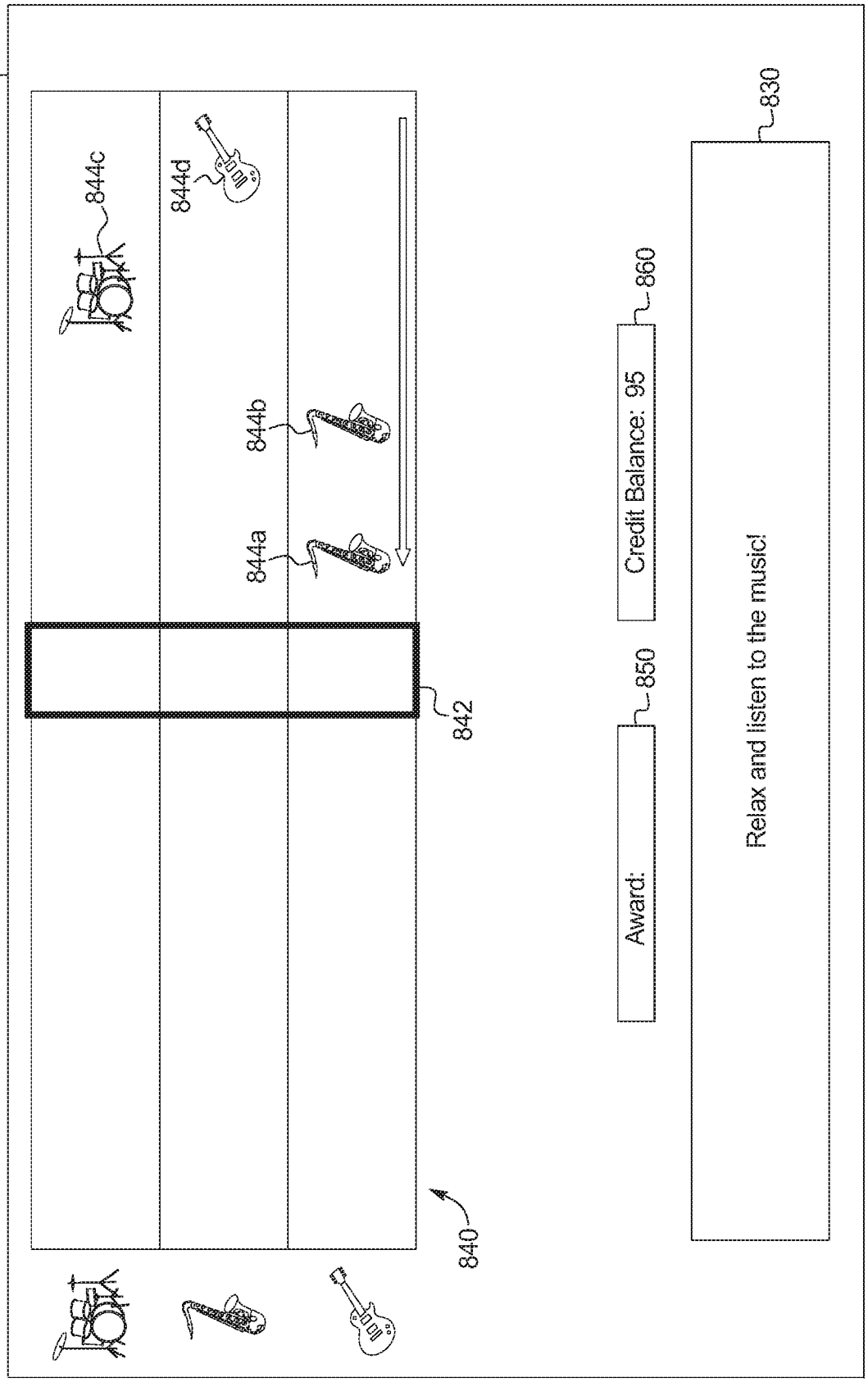

FIG. 9A
Press Your Luck or Test Your Skill
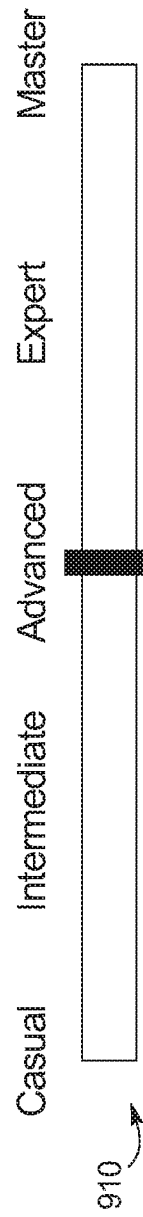
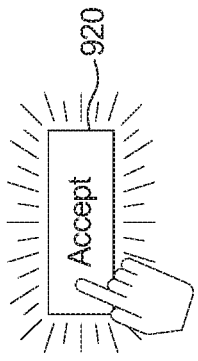
Casual  Intermediate  Advanced  Expert  Master
910
912
920 Accept
930
You selected the Advanced skill level.
Please wait for your play of the bonus game to begin.

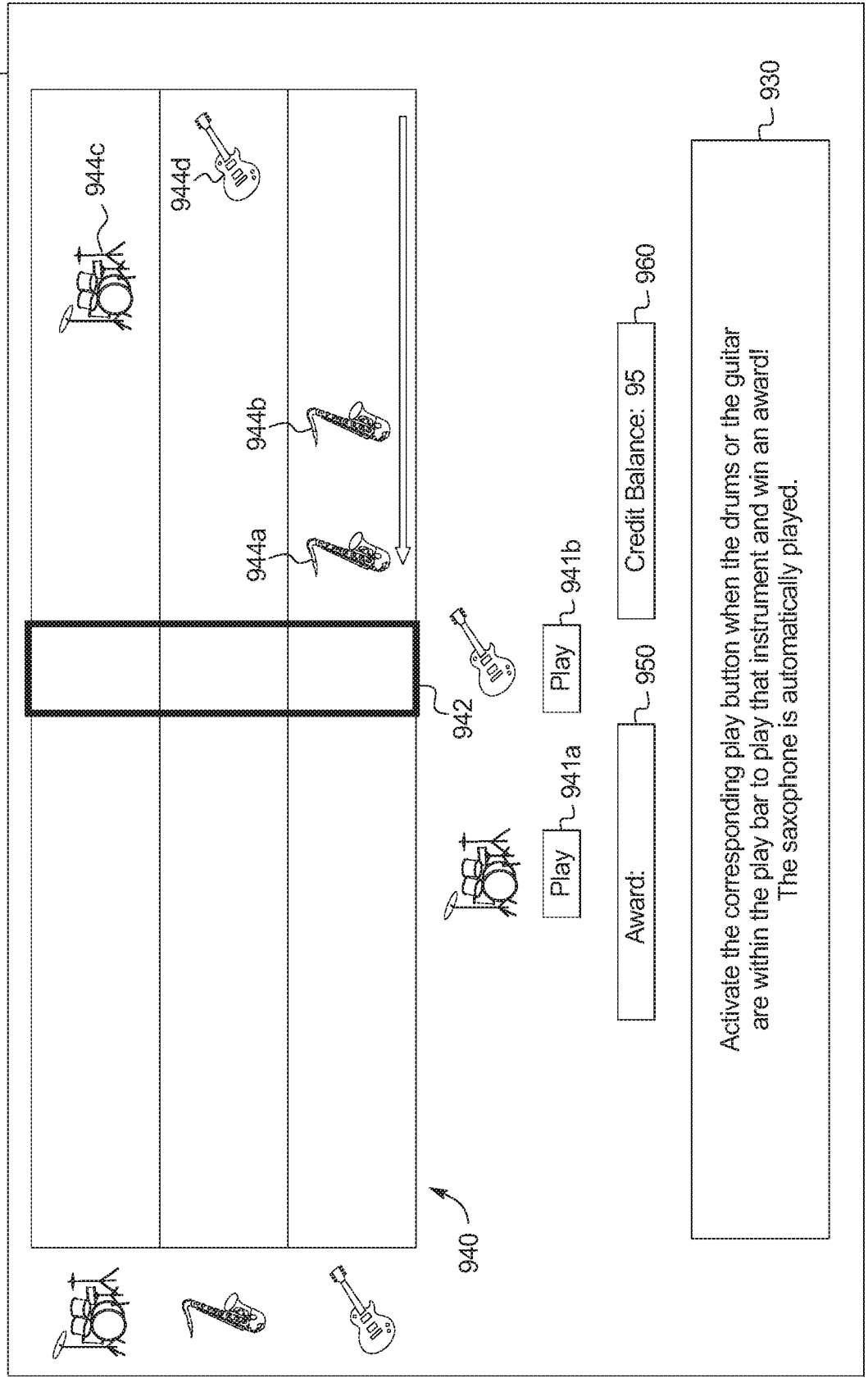

FIG. 10A
Press Your Luck or Test Your Skill
Casual    Intermediate    Advanced    Expert    Master
1010  1012
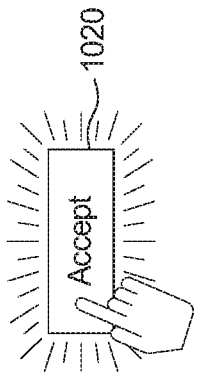
1020
You selected the Master skill level.
Please wait for your play of the bonus game to begin.
— 1030
1116, 1118

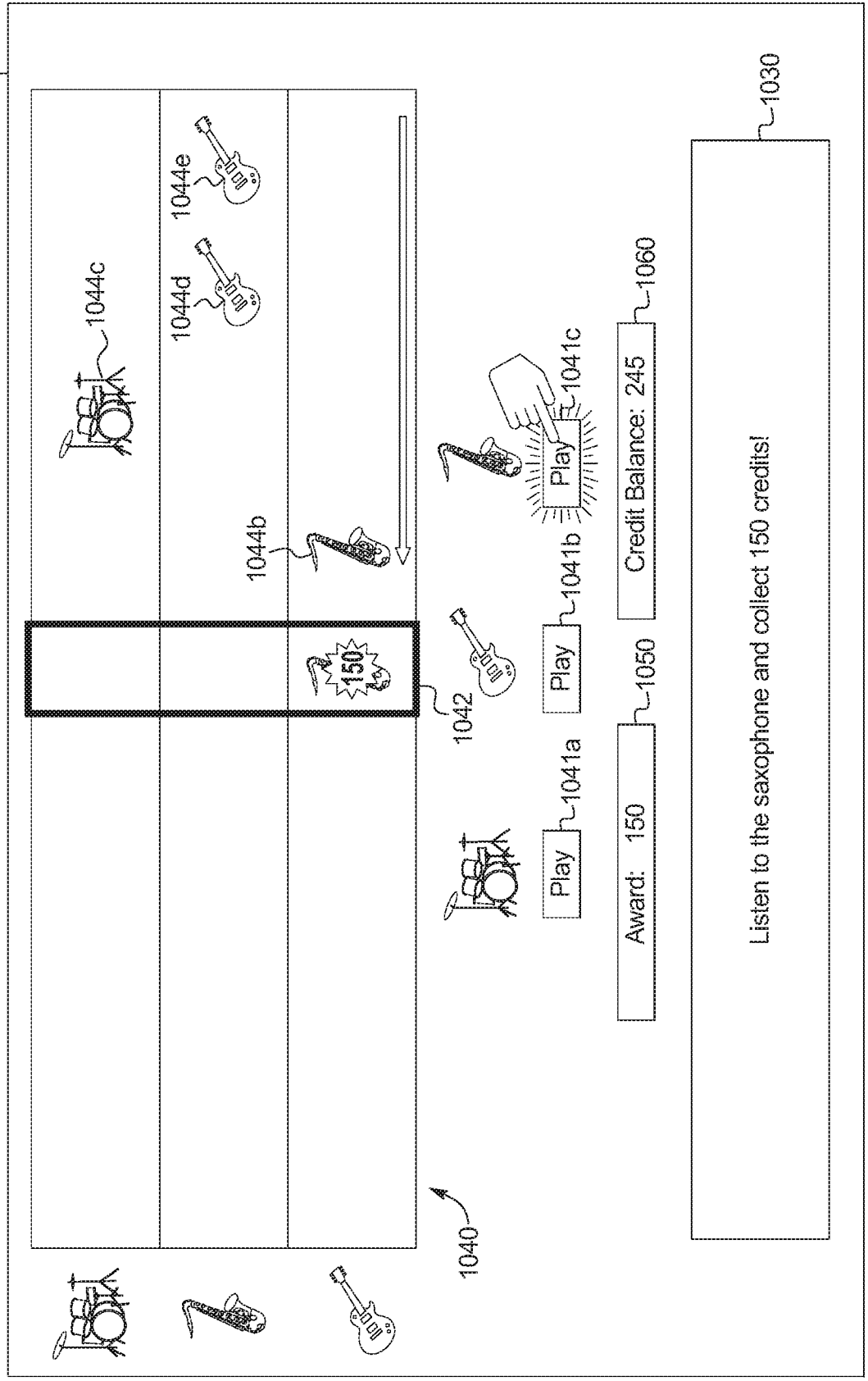

GAMING SYSTEM AND METHOD PROVIDING ONE OF A PLURALITY OF DIFFERENT VERSIONS OF A GAME BASED ON A PLAYER SELECTED SKILL LEVEL

PRIORITY CLAIM

This patent application is a continuation of and claims priority to and the benefit of U.S. patent application Ser. No. 13/626,629, which was filed on Sep. 25, 2012, the entire contents of which are incorporated herein by reference.

COPYRIGHT NOTICE

A portion of the disclosure of this patent document contains material that is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Electronic gaming machines (EGMs) that provide players awards in primary or base games are well known. These EGMs generally require a player to place a wager to activate a play of the primary game. For many of these EGMs, any award provided to a player for a wagered-on play of a primary game is based on the player obtaining a winning symbol or a winning symbol combination and on an amount of the wager (e.g., the higher the amount of the wager, the higher the award). Winning symbols or winning symbol combinations that are less likely to occur typically result in higher awards being provided when they do occur.

For such known EGMs, an amount of a wager placed on a primary game by a player may vary. For instance, an EGM may enable a player to wager a minimum quantity of credits, such as one credit (e.g., one penny, nickel, dime, quarter, or dollar), up to a maximum quantity of credits, such as five credits. The EGM may enable the player to place this wager a single time or multiple times for a single play of the primary game. For instance, an EGM configured to operate a slot game may have one or more paylines, and the EGM may enable a player to place a wager on each of the paylines for a single play of the slot game. Thus, it is known that an EGM, such as one configured to operate a slot game, may enable players to place wagers of substantially different amounts on each play of a primary game. For example, the amounts of the wagers may range from one credit up to 125 credits (e.g., five credits on each of twenty-five separate paylines). This is also true for other wagering games, such as video draw poker, in which players can place wagers of one or more credits on each hand, and in which multiple hands can be played simultaneously. Accordingly, it should be appreciated that different players play at substantially different wager amounts or levels and substantially different rates of play.

Bonus or secondary games are also known in EGMs. Such EGMs usually provide an award to a player for a play of one such bonus game in addition to any awards provided for any plays of any primary games. Bonus games usually do not require an additional wager to be placed by the player to be initiated. Bonus games are typically initiated or triggered upon an occurrence of a designated triggering symbol or designated triggering symbol combination in the primary game. For instance, an EGM may initiate or trigger a bonus game when a bonus symbol occurs on the payline on the third reel of a three reel slot machine. The EGM generally indicates when a bonus game is initiated or triggered through one or more visual and/or audio output devices, such as the reels, lights, speakers, display screens, etc. Part of the enjoyment and excitement of playing certain EGMs is the initiation or triggering of a bonus game, even before the player knows an amount of a bonus award won via the bonus game.

In most jurisdictions, primary wagering games of EGMs are games of chance, not games of skill. For instance, in an EGM configured to operate a slot game, a player must place a wager on the slot game to initiate a play of the slot game, and the EGM randomly determines a winning outcome or a losing outcome for the slot game. The determined outcome determines whether the EGM provides the player an award according to a paytable associated with the slot game.

One reason EGMs and, in particular, EGMs configured to operate slot games, are popular is because an amateur, novice, or inexperienced player can play most slot games at the player's own pace. Such slot games require no special skills, strategy development or implementation, or risk evaluation. Thus, inexperienced players can perform as well as seasoned or experienced players at these slot games.

Certain EGMs configured to operate games such as video poker and video blackjack involve certain player strategy or decision-making. For instance, the player decides which cards to hold in a draw-type video poker game and whether to take additional cards in a video blackjack-type card game. These games generally require the player to develop and implement a certain level of strategy for the player to be successful. Some bonus games require a player to risk an award won for a chance to achieve a higher award. These games also can generally be said to require a player to implement a certain level of strategy for the player to be successful.

Certain other bonus games also involve skill, apparent skill, or pseudo skill. In certain of these bonus games, any awards are generally randomly determined. The player's participation in the skill, apparent skill, or pseudo skill event may, for instance, determine the timing of when the EGM provides the player an award. In another known EGM, the player's skill determines which set or pool of awards will be used to determine the award the EGM eventually provides to the player. The processor of the EGM randomly determines an award from the determined set or pool of awards to provide to the player.

In other jurisdictions, wagering games of EGMs are required to involve a skill event, such as an event requiring player dexterity, to be successful. These games cannot turn purely upon a random outcome. These EGMs thus require strategy implementation or timing of inputs by the player to determine chance of success and failure. If the player does not play optimally, the actual payout percentage of the EGM will decrease accordingly.

Skill games are generally interactive and are enjoyable for certain people to play. Many people have grown accustomed to, and comfortable with, playing skill games at arcades; on dedicated video gaming devices; on handheld video gaming devices; on various computing devices such as desktop computing devices, laptop computing devices, and tablet computing devices; on mobile devices such as mobile phones and personal digital assistants; over data networks such as LAN networks, WAN networks, and the Internet; and the like. Some of these people who are accustomed to playing such skill or partial skill games may not want to play games of chance on conventional EGMs where the outcomes of the games are based on randomly generated outcomes and involve little or no skill. Some of these people also enjoy the competitive nature of skill games, which is not provided by conventional wagering games.

Wagering games that are purely skill games or are partial skill games present certain problems for game designers and gaming establishments. For instance, skill games can be mastered by players having a high level of skill, substantial practice, or both. To combat the mastering of such games and to make the economics work, a game designer may have to make the skill game relatively difficult. The difficulty level may be too great for inexperienced or average players to have a sufficient level of success and enjoyment while playing the games. Such players may not have a good gaming experience and may not repeat play on the EGMs.

There is a continuing need to provide new and different gaming systems and methods that provide skill-based games and that cater to highly skilled players while still accommodating lesser skilled players.

SUMMARY

Various embodiments of the present disclosure provide a gaming system and method providing one of a plurality of different versions of a game based on a player selected skill level. Generally, the gaming system of the present disclosure enables a player to determine how much of an outcome of a play of a game depends on chance and how much of the outcome depends on the player's skill. The gaming system enables the player to do so by enabling the player to select one of a plurality of different skill levels associated with the game, selecting one of a plurality of different versions of the game such that the amount of skill necessary to succeed in the selected version of the game is based on the selected skill level, and providing a play of the selected version of the game.

More specifically, in one embodiment, upon an occurrence of a bonus game triggering event in association with play of a primary wagering game, the gaming system displays an indication of each of a plurality of different skill levels associated with a bonus game. Each of the different skill levels is associated with a different version of the bonus game. The gaming system enables a player to select one of the different skill levels, and receives a player selection of one of the different skill levels. The gaming system displays a play of the version of the bonus game associated with the selected skill level, and determines an outcome for the play of that version of the bonus game.

In this embodiment, if the selected skill level is a designated skill level (such as a lowest skill level), the gaming system randomly determines the outcome for the play of that version of the bonus game. That is, the gaming system does not take player skill into account when determining the outcome for the play of that version of the bonus game. If, on the other hand, the selected skill level is greater than the designated skill level, the gaming system receives at least one quantifiable skill input from the player in association with the play of that version of the bonus game. It should be appreciated that a quantifiable skill input is an input that tends to measure one or more aspects of the player's skills as they relate to the version of the bonus game being played. The gaming system determines the outcome based at least in part on the received at least one quantifiable skill input. The gaming system determines any awards based on the determined outcome, and displays and provides any determined awards.

In certain embodiments, even if the selected skill level is the designated skill level, the gaming system receives at least one quantifiable skill input from the player in association with the play of the version of the bonus game associated with the designated skill level. The gaming system determines the outcome for the play of that version of the bonus game based at least in part on the received at least one quantifiable skill input. Thus, in these embodiments, the gaming system takes player skill into account when determining an outcomes for any of the versions of the game, even the one associated with the designated skill level.

In other embodiments, even if the selected skill level is the designated skill level, the gaming system receives at least one quantifiable skill input from the player in association with the play of the version of the bonus game associated with the designated skill level. In these embodiments, however, the gaming system nevertheless randomly determines the outcome associated with the play of the version of the bonus game associated with the designated skill level. Put differently, in these embodiments, the version of the bonus game associated with the designated skill level is one involving perceived skill or that appears to involve skill, but employs randomly determined outcomes that are not based on skill.

In certain embodiments, each version of the bonus game has one of a plurality of different average expected payback percentages. For each of the different versions of the bonus game, the average expected payback percentage of that version of the bonus game is higher than the average expected payback percentage of the version of the bonus game associated with each lower skill level (if any). In other words, in these embodiments, the versions of the bonus game associated with relatively high skill levels (i.e., that require more skill to be successful) have higher average expected payback percentages (such as 5% higher) than the versions of the bonus game associated with relatively low skill levels (i.e., that require less skill to be successful).

In further embodiments, each of the different versions of the bonus game has one of a plurality of different volatilities. For each of the different versions of the bonus game, the volatility of that version of the bonus game is lower than the volatility of the version of the bonus game associated with each lower skill level (if any). In other words, the versions of the bonus game associated with relatively high skill levels (i.e., that require more skill to be successful) have lower volatilities than the versions of the bonus game associated with relatively low skill levels (i.e., that require less skill to be successful).

It should thus be appreciated that, in various embodiments, the gaming system of the present disclosure is configured to reward players having relatively high levels of skill by enabling those players to select relatively high skill levels for play of the bonus game that are associated with relatively high average expected payback percentages. The gaming system accommodates lesser skilled players by enabling those players to select relatively low skill levels, such as a skill level involving no skill at all, rather than requiring those players to play the more difficult versions of the game associated with the relatively high skill levels and putting them at a disadvantage.

Additional features and advantages are described in, and will be apparent from, the following Detailed Description and the Figures.

BRIEF DESCRIPTION OF THE FIGURES

FIG. 1 is a flowchart illustrating an example method of operating one embodiment of the gaming system of the present disclosure.

FIGS. 2A, 2B, 2C, and 2D illustrate screen shots of an example embodiment of the gaming system of the present disclosure providing a play of a version of a collection game associated with a Casual skill level.

FIGS. 3A and 3B illustrate screen shots of another example embodiment of the gaming system of the present disclosure providing a play of a version of the collection game associated with an Advanced skill level.

FIGS. 4A and 4B illustrate screen shots of another example embodiment of the gaming system of the present disclosure providing a play of a version of the collection game associated with a Master skill level.

FIGS. 5A, 5B, and 5C illustrate screen shots of an example embodiment of the gaming system of the present disclosure providing a play of a version of a target shooting game associated with a Casual skill level.

FIGS. 6A and 6B illustrate screen shots of another example embodiment of the gaming system of the present disclosure providing a play of a version of the target shooting game associated with an Advanced skill level.

FIGS. 7A and 7B illustrate screen shots of another example embodiment of the gaming system of the present disclosure providing a play of a version of the target shooting game associated with a Master skill level.

FIGS. 8A, 8B, and 8C illustrate screen shots of an example embodiment of the gaming system of the present disclosure providing a play of a version of a musical game associated with a Casual skill level.

FIGS. 9A, 9B, and 9C illustrate screen shots of another example embodiment of the gaming system of the present disclosure providing a play of a version of the musical game associated with an Advanced skill level.

FIGS. 10A, 10B, and 10C illustrate screen shots of another example embodiment of the gaming system of the present disclosure providing a play of a version of the musical game associated with a Master skill level.

DETAILED DESCRIPTION

Figure 2B:
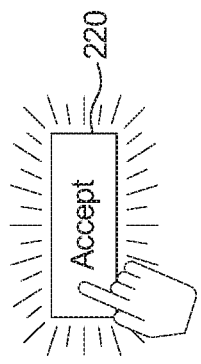

Providing One of a Plurality of Different Versions of a Game Based on a Player Selected Skill Level Various embodiments of the present disclosure provide a gaming system and method providing one of a plurality of different versions of a game based on a player selected skill level. While different embodiments of the game are described below as bonus games, it should be appreciated that such games may additionally or alternatively be employed as base or primary games. Moreover, while the player's credit balance and certain of the awards described below are amounts of monetary credits or currency, the player's credit balance and/or one or more awards may include non-monetary credits, promotional credits, and/or player tracking points or credits. It should be appreciated that any wagers placed by the player (such as on a play of a primary wagering game) may be placed using non-monetary credits, promotional credits, and/or player tracking points or credits in addition to or instead of monetary credits or currency.

FIG. 1 illustrates a flowchart of an example process or method 100 of operating the gaming system of the present disclosure. In various embodiments, process 100 is represented by a set of instructions stored in one or more memories and executed by one or more processors. Although process 100 is described with reference to the flowchart shown in FIG. 1, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In this example, upon an occurrence of a bonus game triggering event in association with a play of a primary wagering game by a player, the gaming system displays an indication of each of a plurality of different skill levels associated with a game, as indicated by block 102. The plurality of different skill levels includes any suitable quantity of skill levels including at least a designated skill level and a skill level higher than the designated skill level. In this example, the designated skill level is a lowest skill level, and the plurality of different skill levels includes a highest skill level. Each of the different skill levels is associated with a different version of the game. For each version of the game, the amount of skill necessary for the player to succeed when playing that version of the game depends on the skill level associated with that version of the game. As the skill level increases, the amount of skill necessary for the player to succeed increases. For instance, the amount of skill necessary for the player to succeed when playing the version of the game associated with the lowest skill level is less than the amount of skill necessary for the player to succeed when playing the version of the game associated with the highest skill level.

It should be appreciated that, for a given game or type of game, the different versions of that game differ in ways that impact or relate to the particular skill levels associated with those versions of the game such that certain versions of the game are easier or more difficult (i.e., require less or more skill to succeed) relative to other versions of the game. In one example, the gaming system is configured to operate a plurality of different versions of a multiple choice trivia game, each of which is associated with one of a plurality of different skill levels. For a play of the version of the trivia game associated with the lowest skill level, each question has two possible answer choices (one correct and one incorrect). The player picks the answer choice that the player believes to be the correct answer choice, and the gaming system provides an award if the player picks the correct answer choice. For a play of the version of the trivia game associated with the next highest skill level, those same questions each have three possible answer choices (one correct and two incorrect), making the player's choice more difficult (i.e., requiring relatively more skill to succeed). For a play of the version of the trivia game associated with the next highest skill level, those same questions each have four possible answer choices (one correct and three incorrect), making the player's choice even more difficult (i.e., requiring relatively more skill to succeed). Thus, in this example, as the selected skill level increases, the difficultly of the version of the trivia game provided to the player and, therefore, the amount of skill required to succeed at that version of the trivia game, increases.

Returning to FIG. 1, after displaying the indication of each of the different skill levels, the gaming system enables the player to select one of the different skill levels, as indicated by block 104, and receives a player selection of one of the different skill levels, as indicated by block 106. The gaming system displays a play of the version of the game associated with the selected skill level, as indicated by block 108. The gaming system determines whether the selected skill level is a lowest skill level, as indicated by diamond 110. In this example, the lowest skill level is associated with no skill such that the gaming system determines an outcome for the play of the version of the game associated with the selected skill level based completely on chance, though it should be appreciated that in other embodiments even the lowest skill level requires some skill to succeed (such as the trivia game described above). Accordingly, in this example, if the gaming system determines that the selected skill level is the lowest skill level, the gaming system randomly determines an outcome for the play of the version of the game associated with the selected skill level, as indicated by block 116. That is, the gaming system does not take player skill into effect when determining the outcome for the play of that version of the bonus game. Process 100 continues to block 118, described below.

If, on the other hand, the gaming system determines that the selected skill level is not the lowest skill level, the gaming system receives at least one quantifiable skill input from the player in association with the play of the version of the game associated with the selected skill level, as indicated by block 112. It should be appreciated that a quantifiable skill input is an input that tends to measure one or more aspects of the player's skills as they relate to the version of the bonus game being played. The gaming system determines an outcome for the play of the version of the game associated with the selected skill level based at least in part on the received at least one quantifiable skill input, as indicated by block 114.

The gaming system determines any awards based on the determined outcome, as indicated by block 118. The gaming system displays and provides any determined awards, as indicated by block 120.

FIGS. 2A, 2B, 2C, and 2D illustrate screen shots of an example embodiment of the gaming system of the present disclosure providing a play of a version of a collection game associated with a Casual skill level. In this example, upon an occurrence of a bonus game triggering event associated with a play of a primary wagering game (not shown), the gaming system displays (such as on display device 1116 or 1118, described below) an indication of each of five different skill levels—Casual, Intermediate, Advanced, Expert, and Master—associated with the collection game. In this example, the skill levels are displayed from left to right in order of increasing skill. That is, the Casual skill level is the lowest skill level, the Intermediate skill level is the second lowest skill level, the Advanced skill level is the middle skill level, the Expert skill level is the second highest skill level, and the Master skill level is the highest skill level. Each of the skill levels is associated with a different version of the collection game. Specifically, the Casual skill level is associated with the easiest version of the collection game (i.e., the version requiring the least amount of skill to succeed); the Intermediate skill level is associated with the second easiest version of the collection game (i.e., the version requiring the second lowest amount of skill to succeed); the Advanced skill level is associated with the third hardest version of the collection game (i.e., the version requiring the third highest amount of skill to succeed); the Expert skill level is associated with the second hardest version of the collection game (i.e., the version requiring the second highest amount of skill to succeed); and the Master skill level is associated with the hardest version of the collection game (i.e., the version requiring the most amount of skill to succeed).

In this example, each version of the collection game has one of a plurality of different average expected payback percentages. Here, for each of the different versions of the collection game, the average expected payback percentage of that version of the collection game is higher than the average expected payback percentage of the version of the collection game associated with each lower skill level (if any). In other words, in this example, the versions of the collection game associated with relatively high skill levels (i.e., that require more skill to be successful) have higher average expected payback percentages than the versions of the collection game associated with relatively low skill levels (i.e., that require less skill to be successful). Thus, in this example, highly skilled players may benefit from the higher average expected payback percentages associated with higher skill levels.

Additionally, in this example, each version of the collection game has one of a plurality of different volatilities. Here, for each of the different versions of the collection game, the volatility of that version of the collection game is lower than the volatility of the version of the collection game associated with each lower skill level (if any). In other words, the versions of the collection game associated with relatively high skill levels (i.e., that require more skill to be successful) have lower volatilities than the versions of the collection game associated with relatively low skill levels (i.e., that require less skill to be successful). Thus, in this example, lesser skilled players may benefit from the higher volatilities associated with lower skill levels, which enables those players to (potentially) win higher awards than those available in association with higher skill levels.

Turning to FIG. 2A, the gaming system enables a player to select one of the different skill levels my manipulating a slider bar 212 of a slider 210. Specifically, the gaming system enables the player to use an input device (such as a touch screen) to move slider bar 212 from left to right to indicate which of the skill levels the player desires to select, and enables the player to then activate accept button 220 to confirm the selected skill level. The gaming system displays the following message in message display 230: "YOU TRIGGERED THE BONUS GAME! USE THE SLIDER TO SELECT A SKILL LEVEL. MOVE THE SLIDER ALL THE WAY TO THE RIGHT FOR THE HIGHEST SKILL LEVEL, THE LARGEST AVERAGE EXPECTED PAYBACK PERCENTAGE, AND THE LOWEST VOLATILITY; ALL THE WAY TO THE LEFT FOR THE LOWEST SKILL LEVEL, THE LOWEST AVERAGE EXPECTED PAYBACK PERCENTAGE, AND THE HIGHEST VOLATILITY; OR ANYWHERE IN BETWEEN!"

As illustrated in FIG. 2B, in this example the player moves slider bar 212 to indicate the Casual skill level. The gaming system receives an activation of accept button 220 from the player indicating the player's desire to select the Casual skill level for a play of the collection game. The gaming system displays the following message in message display 230: "YOU SELECTED THE CASUAL SKILL LEVEL. PLEASE WAIT FOR YOUR PLAY OF THE BONUS GAME TO BEGIN."

As illustrated in FIG. 2C, the gaming system initiates a play of the version of the collection game associated with the Casual skill level. Upon initiation of the play of the Casual version of the collection game, the gaming system displays a game display area 240, in which the gaming system displays the play of the Casual version of the collection game; an award meter 250, which is configured to display any awards won by the player for the play of the Casual version of the collection game; and a credit meter 260, which displays the player's credit balance (which is 95 credits at this point). The gaming system displays a collector 242 and a plurality of objects 244a, 244b, 244c, 244d, 244e, 244f, 244g, 244h, 244i, 244j, 244k, 244l, 244m, 244n, and 244o in game display area 240.

In the Casual version of the collection game, each of the objects is associated with an award that is not displayed. That is, each of the objects is associated with a mystery award (from the player's perspective). During play of the collection game, the gaming system displays the objects moving from right to left and the collector as stationary (or vice-versa, or a combination thereof). The gaming system enables the player to move collector 242 up and down. The goal of the collection game is to cause the collector to collide with the objects. When the collector collides with an object, the gaming system provides the award associated with that object to the player. In the Casual version of the collection game, the gaming system arranges the objects such that the collector is guaranteed to collide with a plurality of objects. In this example, the gaming system arranges the objects into a plurality of columns such that the collector is guaranteed to collide with one object in each column. The gaming system displays the following message in message display 230: "MOVE YOUR COLLECTOR UP AND DOWN AS IT FLIES FROM LEFT TO RIGHT TO COLLIDE WITH THE OBJECTS AND COLLECT AWARDS!"

As illustrated in FIG. 2D, the player moves collector 242 downward such that collector 242 collides with object 244d. Accordingly, the gaming system displays and provides the award of 75 credits associated with object 244d to the player. The gaming system displays the award of 75 credits in award display 250, and updates credit meter 260 to reflect the 75 credit award (i.e., increases the player's credit balance from 95 credits to 170 credits). The gaming system displays the following message in message display 230: "CONGRATULATIONS, YOU WIN 75 CREDITS!"

FIGS. 3A and 3B illustrate screen shots of an example embodiment of the gaming system of the present disclosure providing a play of the Advanced version of the collection game. In this example, upon the occurrence of the bonus game triggering event associated with the play of a primary wagering game (not shown), the gaming system displays an indication of each of the five different skill levels associated with the collection game, as described above. As illustrated in FIG. 3A, in this example the player moves slider bar 312 to indicate the Advanced skill level. The gaming system receives an activation of accept button 320 from the player indicating the player's desire to select the Advanced skill level for a play of the collection game. The gaming system displays the following message in message display 330: "YOU SELECTED THE ADVANCED SKILL LEVEL. PLEASE WAIT FOR YOUR PLAY OF THE BONUS GAME TO BEGIN."

As illustrated in FIG. 3B, the gaming system initiates a play of the version of the collection game associated with the Advanced skill level. Upon initiation of the play of the Advanced version of the collection game, the gaming system displays a collector 342 and a plurality of objects 344a, 344b, 344c, 344d, 344e, 344f, 344g, 344h, 344i, 344j, 344k in game display area 340. In the Advanced version of the collection game, the awards associated with certain of the objects are displayed in association with those objects, while the awards associated with certain other objects are not displayed. That is, certain of the objects are associated with known awards while other objects are associated with mystery awards (from the player's perspective). In the Advanced version of the collection game, the gaming system arranges the objects such that the collector is guaranteed to collide with fewer objects than the collector is guaranteed to collide with in the Casual version of the collection game. In this example, the gaming system arranges the objects into columns, wherein certain of the columns are arranged such that the collector is guaranteed to collide with one of the objects of each of those columns and other of the columns are arranged such that the collector is not guaranteed to collide with one of the objects of each of those columns. Thus, the Advanced version of the collection game requires more skill to succeed (i.e., more skill to cause the collector to collide with objects) than the Casual version of the collection game. The gaming system displays the following message in message display 330: "MOVE YOUR COLLECTOR UP AND DOWN AS IT FLIES FROM LEFT TO RIGHT TO COLLIDE WITH THE OBJECTS AND COLLECT AWARDS!"

Figure 4A:
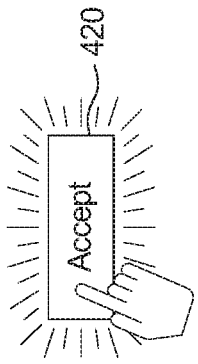

FIGS. 4A and 4B illustrate screen shots of an example embodiment of the gaming system of the present disclosure providing a play of the Master version of the collection game. In this example, upon the occurrence of the bonus game triggering event associated with the play of a primary wagering game (not shown), the gaming system displays an indication of each of the five different skill levels associated with the collection game, as described above. As illustrated in FIG. 4A, in this example the player moves slider bar 412 to indicate the Master skill level. The gaming system receives an activation of accept button 420 from the player indicating the player's desire to select the Master skill level for a play of the collection game. The gaming system displays the following message in message display 430: "YOU SELECTED THE MASTER SKILL LEVEL. PLEASE WAIT FOR YOUR PLAY OF THE BONUS GAME TO BEGIN."

As illustrated in FIG. 4B, the gaming system initiates a play of the version of the collection game associated with the Master skill level. Upon initiation of the play of the Master version of the collection game, the gaming system displays a movable collector 442 and a plurality of objects 444a, 444b, 444c, 444d, 444e, 444f, 444g in game display area 440. It should be appreciated that there are fewer objects associated with the Master version of the collection game than in the Advanced version of the collection game. In the Master version of the collection game, the awards associated with all of the objects are displayed in association with those objects. That is, each of the objects is associated with a known award (from the player's perspective). In the Master version of the collection game, the gaming system arranges the objects such that the collector is guaranteed to collide with fewer objects than the collector is guaranteed to collide with in the Advanced version of the collection game. In this example, the gaming system arranges the objects into columns, wherein certain of the columns are arranged such that the collector is guaranteed to collide with one of the objects of each of those columns and other of the columns are arranged such that the collector is not guaranteed to collide with one of the objects of each of those columns. Thus, the Master version of the collection game requires more skill to succeed (i.e., more skill to cause the collector to collide with objects) than the Advanced version of the collection game. The gaming system displays the following message in message display 430: "MOVE YOUR COLLECTOR UP AND DOWN AS IT FLIES FROM LEFT TO RIGHT TO COLLIDE WITH THE OBJECTS AND COLLECT AWARDS!"

FIGS. 5A, 5B, and 5C illustrate screen shots of an example embodiment of the gaming system of the present disclosure providing a play of a version of a target shooting game associated with a Casual skill level. In this example, upon an occurrence of a bonus game triggering event associated with a play of a primary wagering game (not shown), the gaming system displays an indication of each of five different skill levels, as described above. As illustrated in FIG. 5A, in this example the player moves slider bar 512 to indicate the Casual skill level. The gaming system receives an activation of accept button 520 from the player indicating the player's desire to select the Casual skill level for a play of the target shooting game. The gaming system displays the following message in message display 530: "YOU SELECTED THE CASUAL SKILL LEVEL. PLEASE WAIT FOR YOUR PLAY OF THE BONUS GAME TO BEGIN."

As illustrated in FIG. 5B, the gaming system initiates a play of the version of the target shooting game associated with the Casual skill level. Upon initiation of the play of the Casual version of the target shooting game, the gaming system displays a game display area 540, in which the gaming system displays the play of the Casual version of the target shooting game; an award meter 550, which is configured to display any awards won by the player for the play of the Casual version of the target shooting game; a credit meter 560, which displays the player's credit balance (which is 95 credits at this point); and a shots remaining meter 570, which indicates how many shots the player has remaining for the play of the Casual version of the target shooting game (which is 10 at this point). The gaming system displays crosshairs 542 and a plurality of targets 544*a*, 544*b*, 544*c*, 544*d*, 544*e*, 544*f*, 544*g*, 544*h*, 544*i*, 544*j*, 544*k*, 544*l*, 544*m*, 544*n*, and 544*o* in game display area 540.

In the Casual version of the target shooting game, each of the targets is associated with an award that is not displayed. That is, each of the targets is associated with a mystery award (from the player's perspective). During play of the target shooting game, the gaming system enables the player to use the shots to "shoot" the targets. When the player hits one of the targets with one of the player's shots, the gaming system provides the award associated with that target to the player. In the Casual version of the target shooting game, the targets are stationary and the gaming system displays crosshairs 542 to help the player aim. The gaming system displays the following message in message display 530: "SHOOT THE TARGETS TO WIN AWARDS!"

As illustrated in FIG. 5D, the player moves hits target 544*g* with the player's first shot. Accordingly, the gaming system displays and provides the award of 25 credits associated with target 544*g* to the player. The gaming system displays the award of 25 credits in award display 550, updates credit meter 560 to reflect the 25 credit award (i.e., increases the player's credit balance from 95 credits to 120 credits), and updates shot display 570 to reflect that the player used one shot (i.e., reduces the player's shots remaining from 10 to 9). The gaming system displays the following message in message display 530: "GOOD SHOT! YOU WIN 25 CREDITS FOR SHOOTING THE TARGET!"

FIGS. 6A and 6B illustrate screen shots of an example embodiment of the gaming system of the present disclosure providing a play of the Advanced version of the target shooting game. In this example, upon the occurrence of the bonus game triggering event associated with the play of a primary wagering game (not shown), the gaming system displays an indication of each of the five different skill levels associated with the collection game, as described above. As illustrated in FIG. 6A, in this example the player moves slider bar 612 to indicate the Advanced skill level. The gaming system receives an activation of accept button 620 from the player indicating the player's desire to select the Advanced skill level for a play of the target shooting game. The gaming system displays the following message in message display 630: "YOU SELECTED THE ADVANCED SKILL LEVEL. PLEASE WAIT FOR YOUR PLAY OF THE BONUS GAME TO BEGIN."

As illustrated in FIG. 6B, the gaming system initiates a play of the version of the target shooting game associated with the Advanced skill level. Upon initiation of the play of the Advanced version of the target shooting game, the gaming system displays a plurality of targets 644*a*, 644*b*, 644*c*, 644*d*, 644*e*, 644*f*, 644*g*, 644*h* in game display area 640. In the Advanced version of the target shooting game, each of the targets is associated with an award that is not displayed. That is, each of the targets is associated with a mystery award (from the player's perspective). In the Advanced version of the target shooting game, the targets are stationary, but the gaming system does not display the crosshairs to help the player aim. Thus, the Advanced version of the collection game requires more skill to succeed (i.e., more skill to hit the targets) than the Casual version of the target shooting game. The gaming system displays the following message in message display 630: "SHOOT THE TARGETS TO WIN AWARDS!"

FIGS. 7A and 7B illustrate screen shots of an example embodiment of the gaming system of the present disclosure providing a play of the Master version of the target shooting game. In this example, upon the occurrence of the bonus game triggering event associated with the play of a primary wagering game (not shown), the gaming system displays an indication of each of the five different skill levels associated with the collection game, as described above. As illustrated in FIG. 7A, in this example the player moves slider bar 612 to indicate the Advanced skill level. The gaming system receives an activation of accept button 620 from the player indicating the player's desire to select the Master skill level for a play of the target shooting game. The gaming system displays the following message in message display 630: "YOU SELECTED THE MASTER SKILL LEVEL. PLEASE WAIT FOR YOUR PLAY OF THE BONUS GAME TO BEGIN."

As illustrated in FIG. 7B, the gaming system initiates a play of the version of the target shooting game associated with the Master skill level. Upon initiation of the play of the Master version of the target shooting game, the gaming system displays a first row of targets 741*a* and a second row of targets 741*b* in game display area 740. In the Master version of the target shooting game, each of the targets is associated with an award that is not displayed. That is, each of the targets is associated with a mystery award (from the player's perspective). In the Master version of the target shooting game, the targets in row 741*a* move from left to right, the targets in row 741*b* move from right to left, and the gaming system does not display the crosshairs to help the player aim. Thus, the Master version of the collection game requires more skill to succeed (i.e., more skill to hit the targets) than the Advanced version of the target shooting game. The gaming system displays the following message in message display 730: "SHOOT THE TARGETS TO WIN AWARDS!"

Figure 8C:
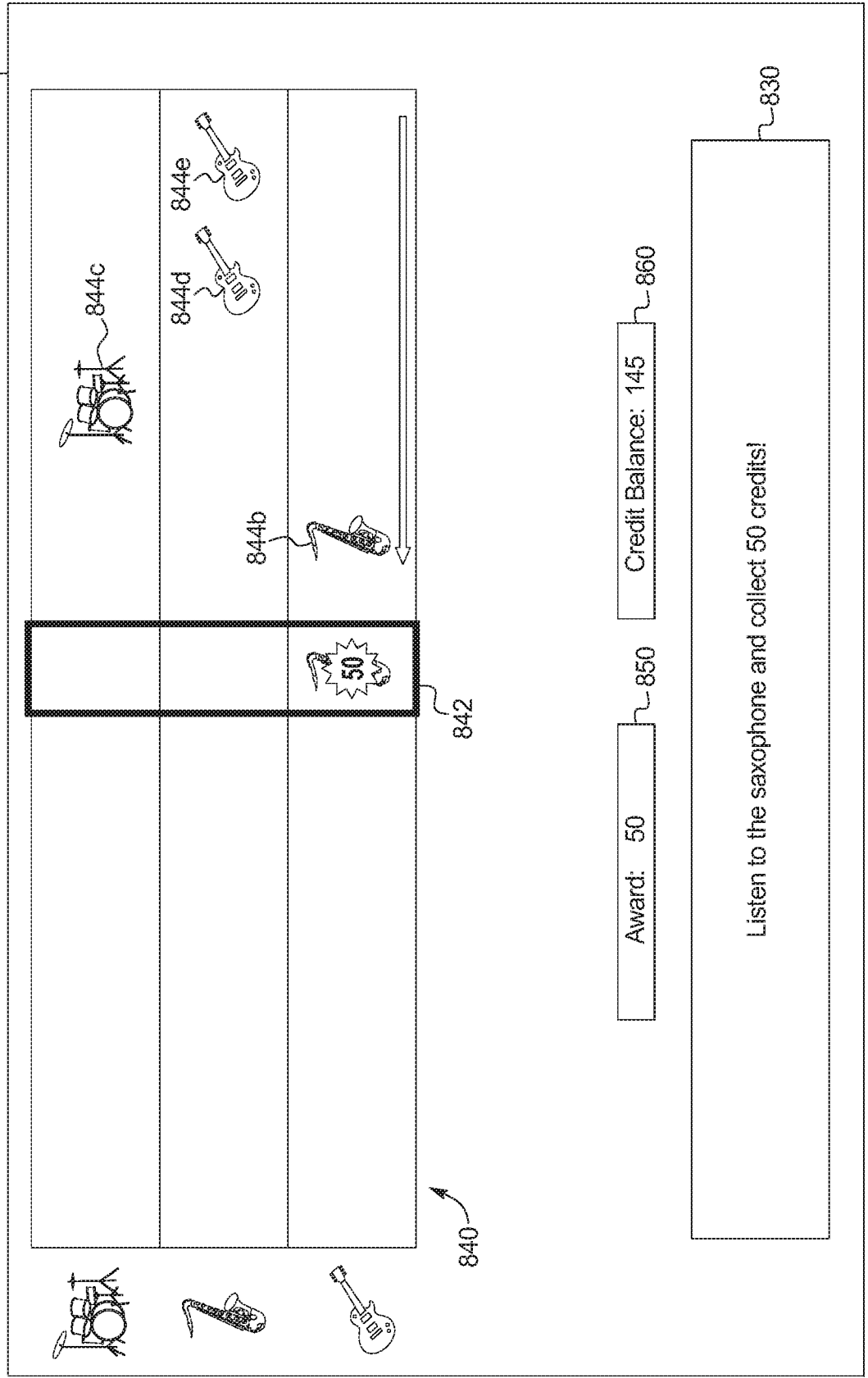

FIGS. 8A, 8B, and 8C illustrate screen shots of an example embodiment of the gaming system of the present disclosure providing a play of a version of a musical game associated with a Casual skill level. In this example, upon an occurrence of a bonus game triggering event associated with a play of a primary wagering game (not shown), the gaming system displays an indication of each of five different skill levels, as described above. As illustrated in FIG. 8A, in this example the player moves slider bar 812 to indicate the Casual skill level. The gaming system receives an activation of accept button 820 from the player indicating the player's desire to select the Casual skill level for a play of the musical game. The gaming system displays the following message in message display 830: "YOU SELECTED THE CASUAL SKILL LEVEL. PLEASE WAIT FOR YOUR PLAY OF THE BONUS GAME TO BEGIN."

As illustrated in FIG. 8B, the gaming system initiates a play of the version of the musical game associated with the Casual skill level. Upon initiation of the play of the Casual version of the musical game, the gaming system displays a game display area 840, in which the gaming system displays the play of the Casual version of the musical game; an award meter 850, which is configured to display any awards won by the player for the play of the Casual version of the musical game; and a credit meter 860, which displays the player's credit balance (which is 95 credits at this point). The gaming system displays a play bar 842 and indications of musical instruments to the right of play bar 842. Specifically, the gaming system displays indications 844a and 844b of a saxophone, indication 844c of a drum set, and indication 844d of a guitar.

In the Casual version of the musical game, each of the musical instruments is associated with an award that is not displayed. That is, each of the musical instruments is associated with a mystery award (from the player's perspective). During play of the musical game, the gaming system displays the indications of the musical instruments scrolling from right to left relative to (stationary) play bar 842. When an indication of a musical instrument enters play bar 842, the gaming system outputs or produces at least one sound associated with that musical instrument and provides the associated award. In the Casual version of the musical game, the gaming system does not enable to make any inputs; that is, the player's skill does not impact the outcome of the Casual version of the musical game. The gaming system displays the following message in message display 830: "RELAX AND LISTEN TO THE MUSIC!"

As illustrated in FIG. 8C, indication 844a of the saxophone enters play bar 842. Accordingly, the gaming system produces the at least one sound associated with the saxophone, and displays and provides the award of 50 credits associated with indication 844a to the player. The gaming system displays the award of 50 credits in award display 850 and updates credit meter 860 to reflect the 50 credit award (i.e., increases the player's credit balance from 95 credits to 145 credits). The gaming system displays the following message in message display 830: LISTEN TO THE SAXOPHONE AND COLLECT 50 CREDITS!"

Figure 9C:
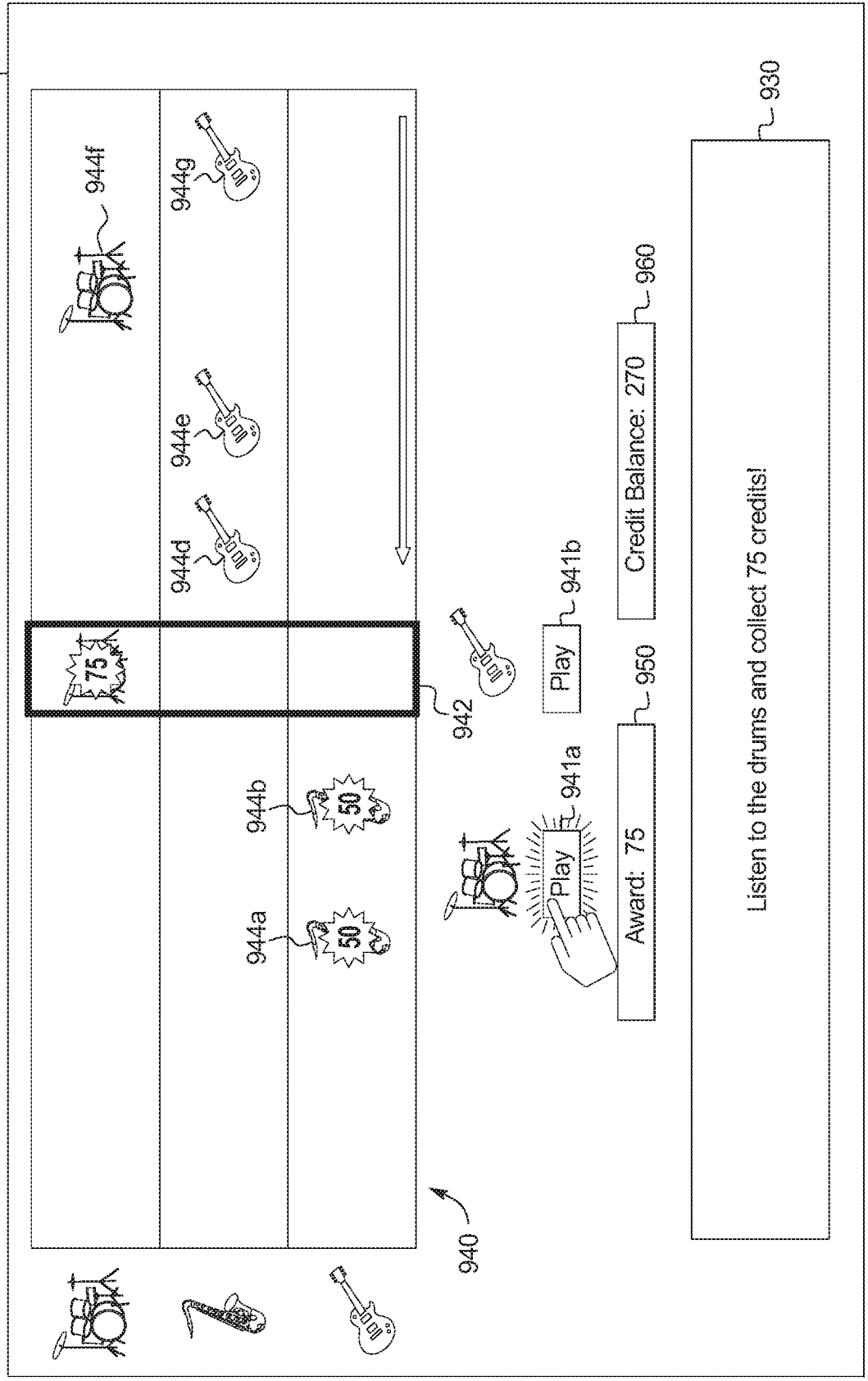

FIGS. 9A, 9B, and 9C illustrate screen shots of an example embodiment of the gaming system of the present disclosure providing a play of the Advanced version of the musical game. In this example, upon the occurrence of the bonus game triggering event associated with the play of a primary wagering game (not shown), the gaming system displays an indication of each of the five different skill levels associated with the collection game, as described above. As illustrated in FIG. 9A, in this example the player moves slider bar 912 to indicate the Advanced skill level. The gaming system receives an activation of accept button 920 from the player indicating the player's desire to select the Advanced skill level for a play of the musical game. The gaming system displays the following message in message display 930: "YOU SELECTED THE ADVANCED SKILL LEVEL. PLEASE WAIT FOR YOUR PLAY OF THE BONUS GAME TO BEGIN."

As illustrated in FIG. 9B, the gaming system initiates a play of the version of the musical game associated with the Advanced skill level. Upon initiation of the play of the Advanced version of the musical game, the gaming system displays a drum play button 941a and a guitar play button 941b. In the Advanced version of the musical game, the gaming system requires the player to activate drum play button 941a when an indication of the drum set (such as indication 944c) enters play bar 950 to cause the gaming system to produce the at least one sound associated with the drum set and to provide the award associated with that indication. Similarly, the gaming system requires the player to activate guitar input button 941b when an indication of the guitar (such as indication 944d) enters play bar 942 to cause the gaming system to produce the at least one sound associated with the guitar and to provide the award associated with that indication. The gaming system does not, however, require the player to do so with respect to the saxophone; rather, the gaming system automatically produces the at least one sound and provides the award associated with an indication of the saxophone that enters play bar 942. Thus, the Advanced version of the musical game requires more skill to succeed (by virtue of the play buttons) than the Casual version of the musical game. The gaming system displays the following message in message display 930: "ACTIVATE THE CORRESPONDING PLAY BUTTON WHEN THE DRUMS OR THE GUITAR ARE WITHIN THE PLAY BAR TO PLAY THAT INSTRUMENT AND WIN AN AWARD! THE SAXOPHONE IS AUTOMATICALLY PLAYED."

As illustrated in FIG. 9C, the gaming system receives an input of drum play button 941a when indication 944c of the drum set is located within play bar 942. Accordingly, the gaming system produces the at least one sound associated with the drum set, and displays and provides the award of 75 credits associated with indication 944c to the player. The gaming system displays the award of 75 credits in award display 950 and updates credit meter 960 to reflect the 75 credit award (i.e., increases the player's credit balance from 195 credits to 270 credits). The gaming system displays the following message in message display 930: LISTEN TO THE DRUMS AND COLLECT 75 CREDITS!"

Figure 10B:
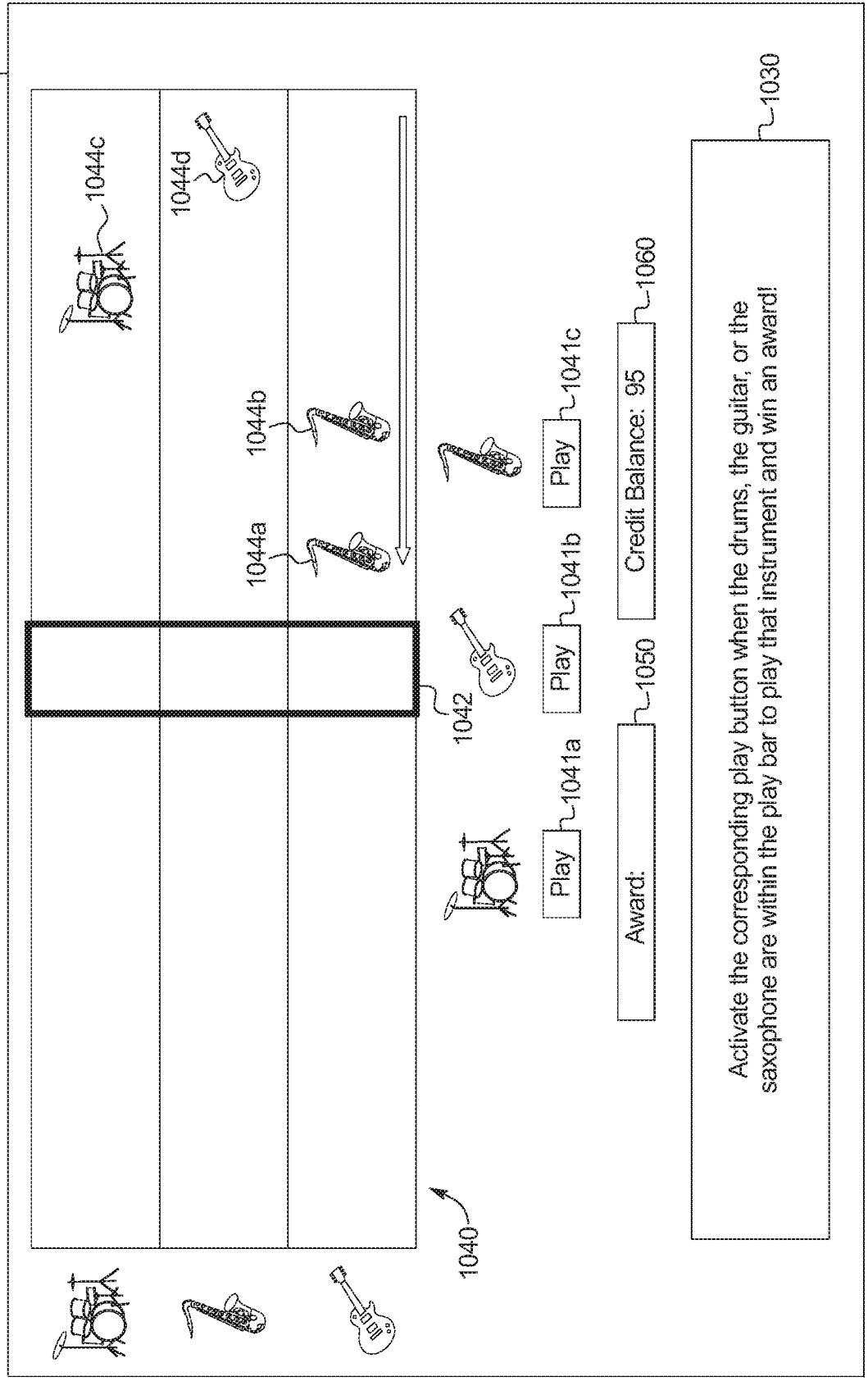

FIGS. 10A, 10B, and 10C illustrate screen shots of an example embodiment of the gaming system of the present disclosure providing a play of the Master version of the musical game. In this example, upon the occurrence of the bonus game triggering event associated with the play of a primary wagering game (not shown), the gaming system displays an indication of each of the five different skill levels associated with the collection game, as described above. As illustrated in FIG. 10A, in this example the player moves slider bar 1012 to indicate the Advanced skill level. The gaming system receives an activation of accept button 1020 from the player indicating the player's desire to select the Master skill level for a play of the musical game. The gaming system displays the following message in message display 1030: "YOU SELECTED THE MASTER SKILL LEVEL. PLEASE WAIT FOR YOUR PLAY OF THE BONUS GAME TO BEGIN."

As illustrated in FIG. 10B, the gaming system initiates a play of the version of the musical game associated with the Master skill level. Upon initiation of the play of the Master version of the musical game, the gaming system displays a drum play button 1041a, a guitar play button 1041b, and a saxophone play button 1041c. In the Master version of the musical game, the gaming system requires the player to activate drum play button 1041a when an indication of the drum set (such as indication 1044c) enters play bar 1050 to cause the gaming system to produce the at least one sound associated with the drum set and to provide the award associated with that indication. Similarly, the gaming system requires the player to activate guitar input button 1041b when an indication of the guitar (such as indication 1044d) enters play bar 1042 to cause the gaming system to produce the at least one sound associated with the guitar and to provide the award associated with that indication. Similarly, the gaming system requires the player to activate saxophone input button 1041c when an indication of the saxophone (such as indication 1044a) enters play bar 1042 to cause the gaming system to produce the at least one sound associated with the saxophone and to provide the award associated with that indication. Thus, the Master version of the musical game requires more skill to succeed (by virtue of no automatic play of any instruments) than the Advanced version of the musical game. The gaming system displays the following message in message display 1030: "ACTIVATE THE CORRESPONDING PLAY BUTTON WHEN THE DRUMS, THE GUITAR, OR THE SAXOPHONE ARE WITHIN THE PLAY BAR TO PLAY THAT INSTRUMENT AND WIN AN AWARD!"

As illustrated in FIG. 10C, the gaming system receives an input of saxophone play button 1041c when indication 1044a of the saxophone is located within play bar 1042. Accordingly, the gaming system produces the at least one sound associated with the saxophone, and displays and provides the award of 150 credits associated with indication 1044a to the player. The gaming system displays the award of 150 credits in award display 1050 and updates credit meter 1060 to reflect the 150 credit award (i.e., increases the player's credit balance from 95 credits to 245 credits). The gaming system displays the following message in message display 1030: LISTEN TO THE SAXOPHONE AND COLLECT 150 CREDITS!"

In other embodiments, the gaming system is configured to provide different types of games associated with different skill levels rather than different versions of a game. In one example, rather than being configured to provide different versions of a game associated with the different skill levels, the gaming system is configured to provide different quantities of plays of different card games based on the selected skill level. Table 1 illustrates the types and quantities of plays of card games associated with each skill level. In this example, the lowest skill level (Casual) requires no player skill to succeed. When the Casual skill level is selected, the gaming system provides eight plays of five card stud, wherein the outcomes of the plays are randomly determined without taking player skill into account. The highest skill level (Master), on the other hand, requires a high level of player skill to succeed. When the Master skill level is selected, the gaming system provides eight plays of five card draw. With perfect play, the player takes advantage of a guaranteed average expected payback percentage (205%) that is greater than the average expected payback percentage associated with the plays of five card stud (200%).

TABLE 1

Example Card Games Associated with Varying Skill Levels

| Skill Level | Card Game(s) | Average Expected Payback Percentage |
| --- | --- | --- |
| Casual | 8 Five Card Stud Hands | 200% |
| Intermediate | 6 Five Card Stud Hands | 200% |
| | 2 Five Card Draw Hands | 205% (with perfect play) |
| Advanced | 4 Five Card Stud Hands | 200% |
| | 4 Five Card Draw Hands | 205% (with perfect play) |
| Expert | 2 Five Card Stud Hands | 200% |
| | 6 Five Card Draw Hands | 205% (with perfect play) |
| Master | 8 Five Card Draw Hands | 205% (with perfect play) |

Table 2 illustrates another such example. In this example, the lowest skill level (Casual) requires no player skill to succeed. When the Casual skill level is selected, the gaming system displays a plurality of spins of an award wheel, and randomly determines outcomes of the spins without taking player skill into account. The highest skill level (Master), on the other hand, requires a high level of player skill to succeed. When the Master skill level is selected, the gaming system provides eight plays of the Master version of the Musical game described above. With perfect play, the player takes advantage of a guaranteed average expected payback percentage of 350%, while the average expected payback percentage of the spins of the award wheel is between 10% and 500%.

TABLE 2

Example Games Associated with Varying Skill Levels

| Skill Level | Game(s) | Average Expected Payback Percentage |
| --- | --- | --- |
| Casual | 8 Spins of Award Wheel | 10% to 500% |
| Intermediate | 6 Spins of Award Wheel | 10% to 500% |
| | 2 Plays of the Master Version of the Musical Game | 350% (with perfect play) |
| Advanced | 4 Spins of Award Wheel | 10% to 500% |
| | 4 Plays of the Master Version of the Musical Game | 350% (with perfect play) |
| Expert | 2 Spins of Award Wheel | 10% to 500% |
| | 6 Five Card Draw Hands | 350% (with perfect play) |
| Master | 8 Plays of the Master Version of the Musical Game | 350% (with perfect play) |

In another embodiment, the gaming system randomly determines the average expected payback percentage for perfect play from a range of average expected payback percentages. For instance, the gaming system determines an "perfect play" average expected payback percentage between 340% and 360%.

In another example embodiment, the game is a dice game. Table 3 illustrates the versions of the dice game associated with each skill level. In this example, the lowest skill level (Casual) requires no player skill to succeed. When the Casual skill level is selected, the gaming system displays a random dice roll and provides the player 100X the roll as an award. The middle skill level (Advanced) requires some skill to succeed. When the Advanced skill level is selected, the gaming system displays a number to the player, enables the player to choose whether the player believes a dice roll will result in a higher or lower number than the displayed number, and displays a dice roll. The gaming system provides an award if the player guessed correctly. The highest (Master) skill level, on the other hand, requires a high level of player skill to succeed. When the Master skill level is selected, the gaming system enables the player to create poker-type hands using dice, and provides awards based on completed "hands."

TABLE 3

Example Versions of a Dice Game Associated with Varying Skill Levels

| Skill Level | Version | Average Expected Payback Percentage |
| --- | --- | --- |
| Casual | Dice Roll | 200% |
| Advanced | Hi-Lo Game | 202.5% (with perfect play) |
| Master | Yahtzee Game | 205% (with perfect play) |

It should be appreciated that the above games are examples, and that the game may be any suitable game involving some level of player skill. For instance, the game may involve: (a) physical skill such as, but not limited to, timing, aiming, and/or physical strength that is quantifiable by zero, one, or a plurality of inputs made by the player in association with the game; (b) mental skill such as knowledge, reasoning, and/or strategy that is quantifiable by zero, one, or a plurality of inputs made by the player in association with the game; (c) identification skill (such as that associated with hidden object game) that is quantifiable by zero, one, or a plurality of inputs made by the player in association with the game; (d) twitch skill (e.g., speed and reflexes) (such as that associated with a real-time strategy game) that is quantifiable by zero, one, or a plurality of inputs made by the player in association with the game; (e) voice control (such as that associated with a karaoke game including voice recognition software) that is quantifiable by zero, one, or a plurality of inputs made by the player in association with the game; (f) steering and maneuvering skill (such as that associated with racing and flight simulators) that is quantifiable by zero, one, or a plurality of inputs made by the player in association with the game; (g) balancing skill (such as that associated with balancing games or tile features) that is quantifiable by zero, one, or a plurality of inputs made by the player in association with the game; (h) button mashing (such as that involved with pressing a certain button as many times as possible during a designated time period) that is quantifiable by zero, one, or a plurality of inputs made by the player in association with the game; and (i) any other type of player skill that is quantifiable by zero, one, or a plurality of inputs made by the player in association with the game.

In one embodiment, the game is a conventional arcade game. In this embodiment, the gaming system is configured to operate an arcade game that is physically similar in appearance and function to a conventional arcade game or arcade machine. For instance, in various embodiments the gaming system is configured to operate at least one of a plurality of original arcade games such as Space Invaders, Asteroids, Pac Man, and Dig Dug; at least one of a plurality of casual arcade games such as Tetris and Bejeweled; at least one of a plurality of first person shooter games such as Doom and Quake; at least one of a plurality of multiplayer online role playing games such as Second Life; at least one of a plurality of simulation arcade games such as bowling, pinball, and table tennis; at least one of a plurality of hidden object games; at least one of a plurality of puzzle games; at least one of a plurality of tournament fighter games; at least one of a plurality of real-time strategy (RTS) games; at least one of a plurality of racing games; at least one of a plurality of interactive story games; at least one of a plurality of adventure games; and at least one of a plurality of simulation games.

In certain embodiments, even if the selected skill level is the designated skill level (the lowest skill level in certain of the examples described above), the gaming system receives at least one quantifiable skill input from the player in association with the play of the version of the bonus game associated with the designated skill level. In these embodiments, however, the gaming system nevertheless randomly determines the outcome associated with the play of the version of the bonus game associated with the designated skill level. Put differently, in these embodiments, the version of the bonus game associated with the designated skill level is one involving perceived skill or that appears to involve skill, but employs randomly determined outcomes that are not based on skill.

It should be appreciated that the gaming system may enable the player to select one of the skill levels in any suitable manner. For instance, the gaming system may provide a dedicated button associated with each skill level, and enable the player to activate the dedicated button associated with the player's desired skill level. In other embodiments, the gaming system recommends a skill level to the player based on that player's gaming history (such as the results of previous plays of the various versions of that game).

In one embodiment, volatility increases as the level of skill increases, and average expected payback percentage decreases as the level of skill increases. In another embodiment, volatility and average expected payback percentage both increase as the level of skill increases. In another embodiment, volatility and average expected payback percentage both decrease as the level of skill increases. In another embodiment, volatility increases as the level of skill increases, while average expected payback percentage remains the same. In another embodiment, volatility decreases as the level of skill increases, while average expected payback percentage remains the same. In another embodiment, average expected payback percentage increases as the level of skill increases, while volatility remains the same. In another embodiment, average expected payback percentage decreases as the level of skill increases, while volatility remains the same.

In various embodiments, as briefly noted above, the bonus game triggering event occurs based on an outcome associated with one or more plays of any primary game of the gaming system. In one embodiment, such outcomes are symbol driven and based on the generation of one or more designated symbols or symbol combinations. In various embodiments, a generation of a designated symbol (or sub-symbol) or a designated set of symbols (or sub-symbols) over one or more plays of a primary game causes the bonus game triggering event to occur.

In another embodiment, the gaming system does not provide any apparent reasons to the player for the bonus game triggering event to occur. In these embodiments, such determinations are not triggered by an event in a primary game or based specifically on any of the plays of any primary game of the gaming system. That is, these bonus game triggering events occur without any explanation or, alternatively, with simple explanations.

In one embodiment, a bonus game triggering event occurs based on an amount of coin-in. In this embodiment, the gaming system determines if an amount of coin-in wagered at one or more EGMs in the gaming system reaches or exceeds a designated amount of coin-in (i.e., a threshold coin-in amount). Upon the amount of coin-in wagered at one or more EGMs in the gaming system reaching or exceeding the threshold coin-in amount, the gaming system causes one or more of such bonus game triggering events to occur. In different embodiments, the threshold coin-in amount is predetermined, randomly determined, determined based on a player's status (such as determined through a player tracking system), determined based on a generated symbol or symbol combination, determined based on a random determination by a central controller, determined based on a random determination at the EGM, determined based on one or more side wagers placed, determined based on the player's primary game wager, determined based on time (such as the time of day), or determined based in any other suitable manner or based on any other suitable factor.

In another embodiment, the bonus game triggering event occurs based on an amount of coin-out. In this embodiment, the gaming system determines if an amount of coin-out provided by one or more EGMs in the gaming system reaches or exceeds a designated amount of coin-out (i.e., a threshold coin-out amount). Upon the amount of coin-out provided at one or more EGMs in the gaming system reaching or exceeding the threshold coin-out amount, the gaming system causes one or more of such events or conditions to occur. In different embodiments, the threshold coin-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), or determined in any other suitable manner or based on any other suitable factor.

In another embodiment, the bonus game triggering event occurs based on a predefined variable reaching a defined parameter threshold. For example, when the 50,000th player has played an EGM of the gaming system (ascertained from a player tracking system), one or more bonus game triggering events occur. In different embodiments, the predefined parameter thresholds include a length of time, a length of time after a certain dollar amount is reached, a wager level threshold for a specific device (e.g., which EGM is the first to contribute $250,000), a number of EGMs active, or any other parameter that defines a suitable threshold.

In another embodiment, the bonus game triggering event occurs based on a quantity of games played. In this embodiment, the bonus game triggering event occurs when a designated quantities of plays of a game has been reached on the gaming system. In one embodiment, such a quantity is determined based on historic data.

In another embodiment, the bonus game triggering event occurs based on time. In this embodiment, a time is set for when one or more of bonus game triggering events will occur. In one embodiment, the set time or times are determined based on historic data.

In another embodiment, the bonus game triggering event occurs based upon gaming system operator defined player eligibility parameters stored on a player tracking system (such as via a player tracking card or other suitable manner). In this embodiment, the parameters for eligibility are defined by the gaming system operator based on any suitable criteria. In one embodiment, the gaming system recognizes a player's identification (via a player tracking system) when the player inserts or otherwise associates the player's player tracking card in the EGM. The gaming system determines the player tracking level of the player and determines whether the current player tracking level defined by the gaming system operator is eligible for one or more of the bonus game triggering events. In one embodiment, the gaming system operator defines minimum bet levels required for such events or conditions to occur based on the player's card level In another embodiment, the bonus game triggering event occurs based on a system determination, including one or more random selections by a central controller. In one embodiment, as described below, the central controller tracks all active EGMs and the wagers placed by their respective players. In one such embodiment, based on the EGM's state as well as one or more wager pools associated with the EGM, the central controller determines whether one or more of bonus game triggering events will occur. In one such embodiment, a player who consistently places a higher wager is more likely to be associated with an occurrence of one or more bonus game triggering events than a player who consistently places a minimum wager. It should be appreciated that the criteria for determining whether a player is in active status or inactive status for determining whether one or more bonus game triggering events may occur may the same as, substantially the same as, or different than the criteria for determining whether a player is in active status or inactive status for another bonus game triggering event to occur.

In another embodiment, the bonus game triggering event occurs based on a determination of whether any numbers allotted to an EGM match a randomly selected number. In this embodiment, upon or prior to each play of each game on each EGM, the EGM selects a random number from a range of numbers and, during each primary game, allocates the first N numbers in the range, where N is the number of credits bet by the player on that play of the primary game. At the end of the primary game, the randomly selected number is compared to the numbers allocated to the player and, if a match occurs, one or more bonus game triggering events occur.

It should be appreciated that any suitable manner of causing the bonus game triggering event to occur may be implemented in accordance with the gaming system of the present disclosure. It should also be appreciated that any of the above-described bonus game triggering events may be combined in one or more different embodiments.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred to herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 11A:
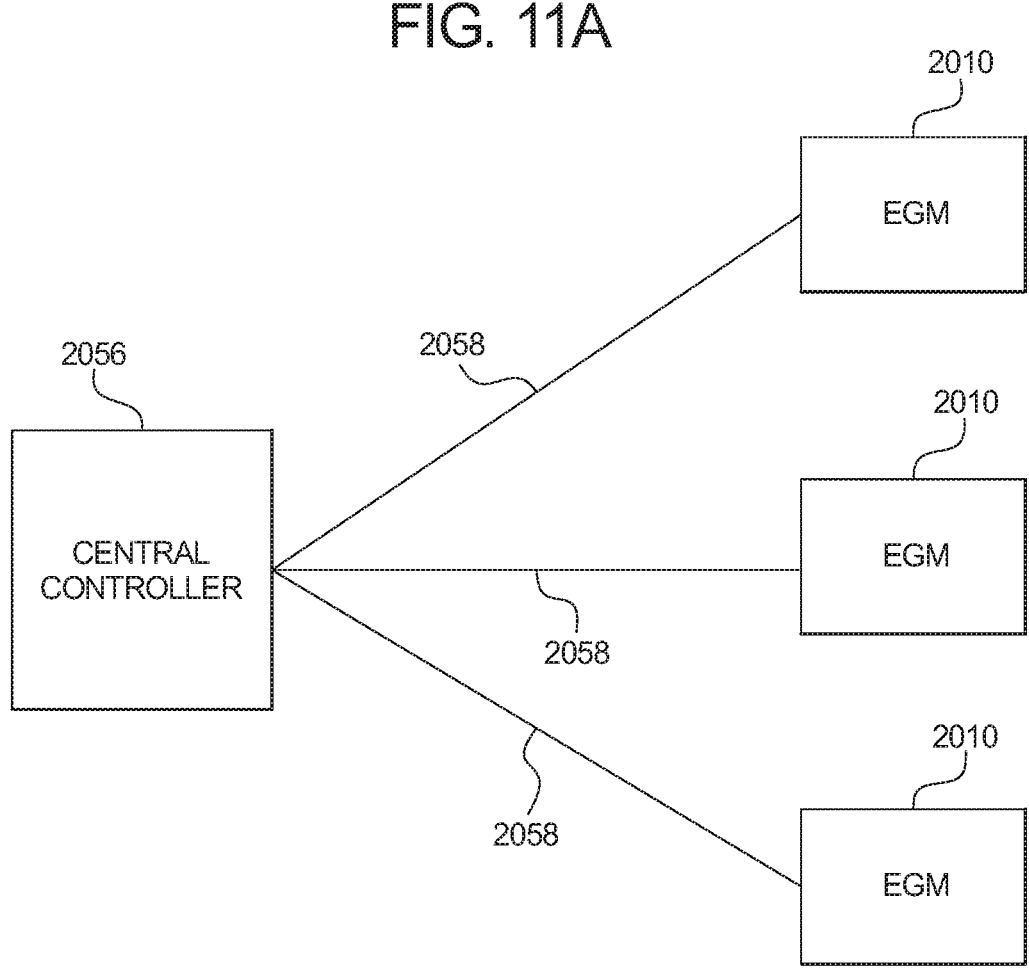
FIG. 11A is a schematic block diagram of one embodiment of a network configuration of the gaming system of the present disclosure.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 11A includes a plurality of EGMs 2010 that are each configured to communicate with a central server, central controller, or remote host 2056 through a data network 2058.

In certain embodiments in which the gaming system includes an EGM in combination with a central server, central controller, or remote host, the central server, central controller, or remote host is any suitable computing device (such as a server) that includes at least one processor and at least one memory device or storage device. As further described below, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 11B:
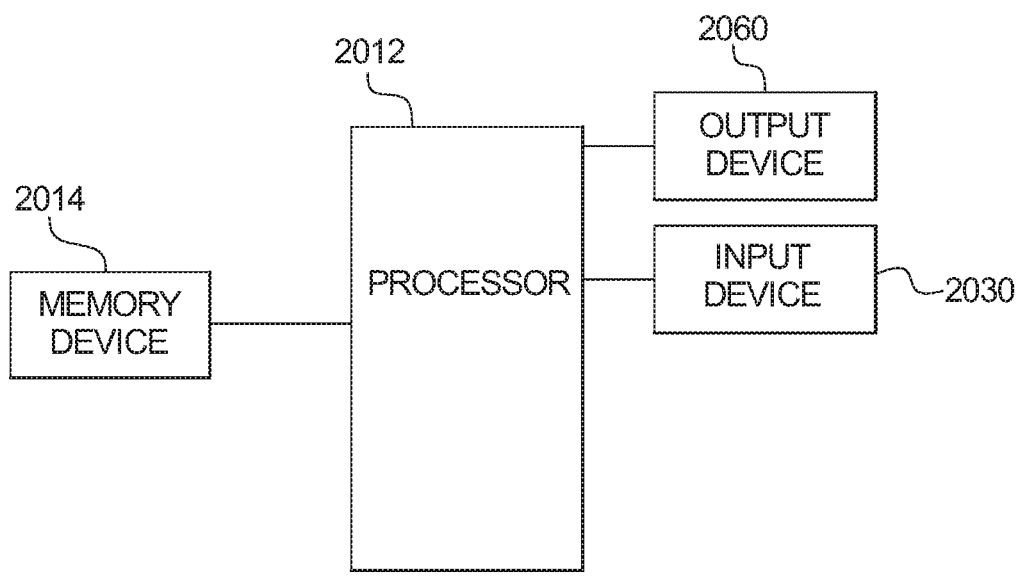
FIG. 11B is a schematic block diagram of an example electronic configuration of the gaming system of the present disclosure.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 11B illustrates an example EGM including a processor 2012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 11B includes a memory device 2014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 12A:
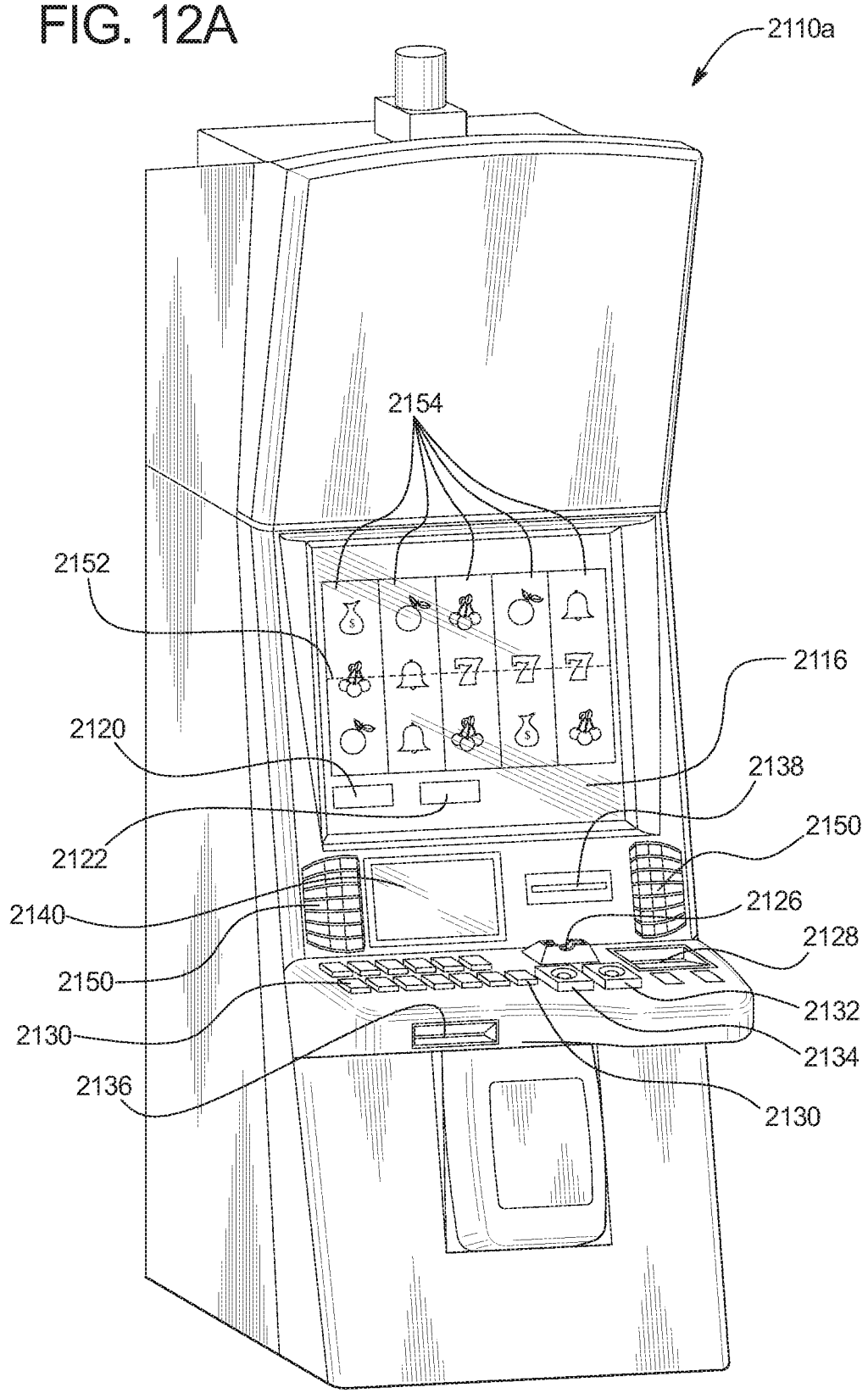
FIGS. 12A and 12B are perspective views of example alternative embodiments of the gaming system of the present disclosure.
Figure 12B:
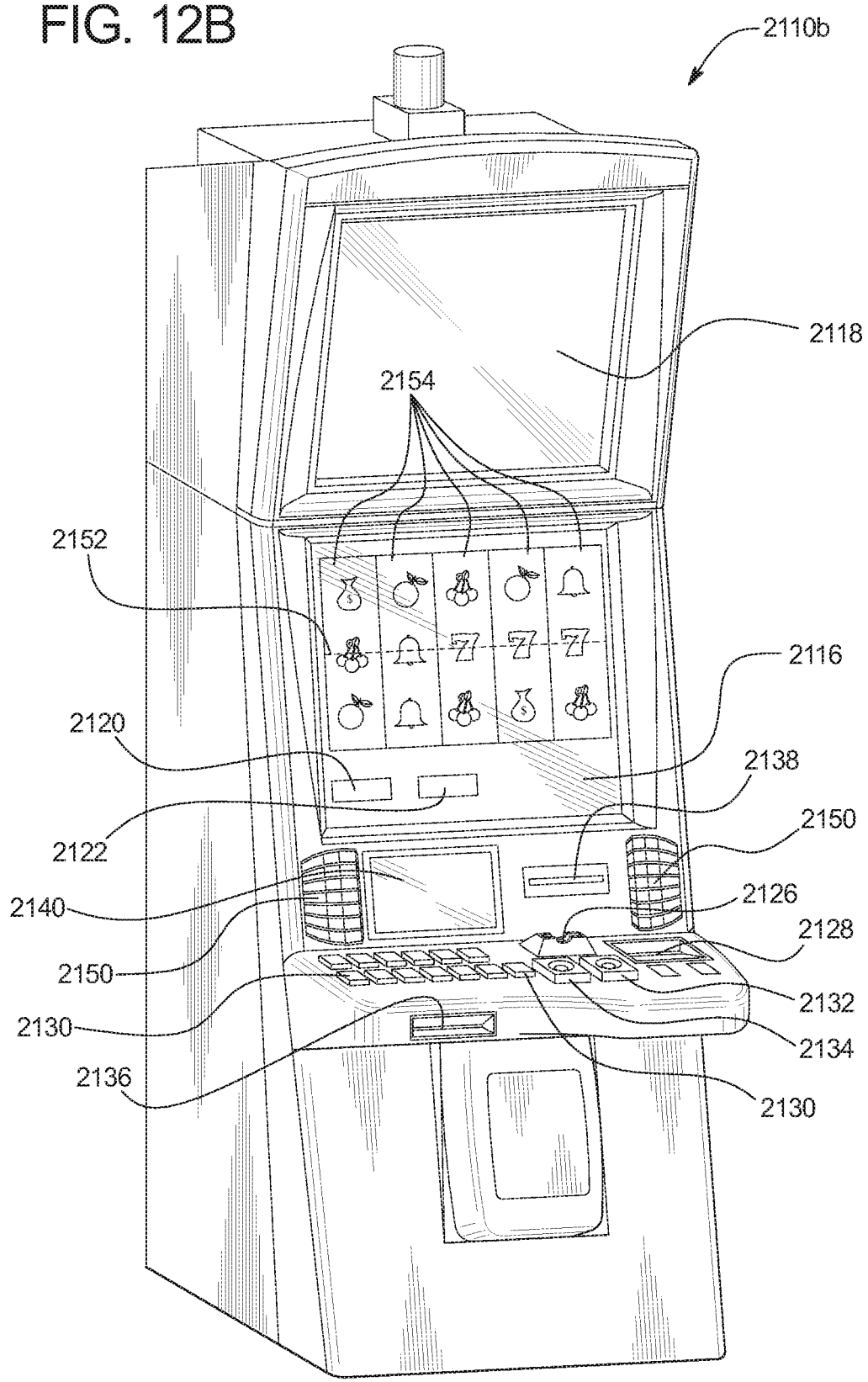

In various embodiments, the EGM includes one or more input devices. The input devices may include any suitable device that enables an input signal to be produced and received by the at least one processor of the EGM. The example EGM illustrated in FIG. 11B includes at least one input device 2030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 12A and 12B illustrate example EGMs that each include the following payment devices: (a) a combined bill and ticket acceptor 2128, and (b) a coin slot 2126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 12A and 12B each include a game play activation device in the form of a game play initiation button 2132. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 12A and 12B each include a cash out device in the form of a cash out button 2134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 12A and 12B each include a card reader 2138. The card reader is configured to read a player identification card inserted into the card reader.

In various embodiments, the EGM includes one or more output devices. The example EGM illustrated in FIG. 11B includes at least one output device 2060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 12A includes a central display device 2116, a player tracking display 2140, a credit display 2120, and a bet display 2122. The example EGM illustrated in FIG. 12B includes a central display device 2116, an upper display device 2118, a player tracking display 2140, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 12A and 12B each include ticket generator 2136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 12A and 12B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 12A and 12B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 12A and 12B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or
Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electromechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIG. 12B includes a payline 2152 and a plurality of reels 2154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims The invention is claimed as follows:

1. A gaming system comprising:
   a payment acceptor;
   a processor; and
   a memory device that stores instructions that, when executed by the processor, cause the processor to:
   responsive to receipt, via the payment acceptor, of a physical item associated with a monetary value, establish a credit balance based on the monetary value associated with the physical item;
   enable selection of one of a plurality of different skill levels, wherein a first one of the skill levels is associated with a first quantity of plays of a first set of one or more games, wherein a second one of the skill levels is associated with a second quantity of plays of a second set of one or more a plurality of games, wherein a quantity of games in the second set of games is greater than a quantity of games in the first set of games, wherein the first quantity of plays is at least one, wherein the second quantity of plays is at least two, wherein the second set of games comprises a skill-based game that is different than each of the games in the first set of games;
   responsive to a selection of the first skill level, provide the first quantity of plays of the first set of games, randomly determine an outcome of the first quantity of plays, and generate any awards based on the plays of the first set of games;
   responsive to a selection of the second skill level, provide the second quantity of plays of the second set of games, the second quantity of plays comprising a play of the skill-based game, determine an outcome of the second quantity of plays based, at least in part, on an input of a quantifiable skill associated with the second set of games, and generate any awards based on the plays of the second set of games; and
   cause a display device to display any awards, the credit balance being increasable by any displayed awards.

2. The gaming system of claim 1, wherein the first set of games and the second set of games both comprise a first game, and wherein the first quantity of plays of the first set of games and the second quantity of plays of the second set of games each comprise a play of the first game.

3. The gaming system of claim 2, wherein the instructions, when executed by the processor, cause the processor to provide the play of the first game by:
   randomly determining an outcome for the play of the first game;
   causing the display device to display the outcome;
   determining any awards based on the outcome; and
   causing the display device to display any awards.

4. The gaming system of claim 1, wherein the first set of games does not include any skill-based games.

5. The gaming system of claim 1, wherein the first quantity of plays is equal to the second quantity of plays.

6. The gaming system of claim 1, wherein the instructions, when executed by the processor, cause the processor to provide the play of the skill-based game by:
   enabling input of a quantifiable skill input;
   after receipt of the quantifiable skill input, determining an outcome based at least in part on the quantifiable skill input;
   determining any awards based on the outcome; and
   causing the display device to display any awards.

7. The gaming system of claim 1, wherein a third one of the skill levels is associated with a third quantity of plays of a third set of a plurality of games, wherein the third quantity of plays is at least one, wherein the third set of games comprises the skill-based game, and wherein the instructions, when executed by the processor, cause the processor to, responsive to a selection of the third skill level, provide the third quantity of plays of the third set of games, the third quantity of plays comprising a play of the skill-based game.

8. The gaming system of claim 1, wherein a third one of the skill levels is associated with a third quantity of plays of a third set of a plurality of skill-based games, wherein the third quantity of plays is at least one, and wherein the instructions, when executed by the processor, cause the processor to, responsive to a selection of the third skill level, provide the third quantity of plays of the third set of skill-based games.

9. The gaming system of claim 8, wherein the first set of games does not include any skill-based games.

10. The gaming system of claim 1, wherein the instructions, when executed by the processor, cause the processor to provide the first quantity of plays of the first set of games by causing data associated with the first quantity of plays of the first set of games to be transmitted over a data network.

11. A method of operating a gaming system, the method comprising:
   responsive to receipt, via a payment acceptor, of a physical item associated with a monetary value, establishing a credit balance based on the monetary value associated with the physical item;
   enabling, by a processor, selection of one of a plurality of different skill levels, wherein a first one of the skill levels is associated with a first quantity of plays of a first set of one or more games, wherein a second one of the skill levels is associated with a second quantity of plays of a second set of a plurality of games, wherein a quantity of games in the second set of games is greater than a quantity of games in the first set of games, wherein the first quantity of plays is at least one, wherein the second quantity of plays is at least two, wherein the second set of games comprises a skill-based game that is different than each of the games in the first set of games;
   responsive to a selection of the first skill level, providing, by the processor, the first quantity of plays of the first set of games, randomly determining, by the processor, an outcome of the first quantity of plays, and generating, by the processor, any awards based on the plays of the first set of games;
   responsive to a selection of the second skill level, providing, by the processor, the second quantity of plays of the second set of games, the second quantity of plays comprising a play of the skill-based game, determining, by the processor, an outcome of the second quantity of plays based, at least in part, on an input of a quantifiable skill associated with the second set of games, and generating, by the processor, any awards based on the plays of the second set of games; and
   displaying, by a display device, any awards, the credit balance being increasable by any displayed awards.

12. The method of claim 11, wherein the first set of games and the second set of games both comprise a first game, and wherein the first quantity of plays of the first set of games and the second quantity of plays of the second set of games each comprise a play of the first game.

13. The method of claim 12, further comprising providing, by the processor, the play of the first game by:
   randomly determining an outcome for the play of the first game;
   causing the display device to display the outcome;
   determining any awards based on the outcome; and
   causing the display device to display any awards.

14. The method of claim 11, wherein the first set of games does not include any skill-based games.

15. The method of claim 11, wherein the first quantity of plays is equal to the second quantity of plays.

16. The method of claim 11, further comprising providing, by the processor, the play of the skill-based game by:
   enabling input of a quantifiable skill input;
   after receipt of the quantifiable skill input, determining an outcome based at least in part on the quantifiable skill input;
   determining any awards based on the outcome; and
   causing the display device to display any awards.

17. The method of claim 11, wherein a third one of the skill levels is associated with a third quantity of plays of a third set of a plurality of games, wherein the third quantity of plays is at least one, wherein the third set of games comprises the skill-based game, and further comprising, responsive to a selection of the third skill level, providing, by the processor, the third quantity of plays of the third set of games, the third quantity of plays comprising a play of the skill-based game.

18. The method of claim 11, wherein a third one of the skill levels is associated with a third quantity of plays of a third set of a plurality of skill-based games, wherein the third quantity of plays is at least one, and further comprising, responsive to a selection of the third skill level, providing, by the processor, the third quantity of plays of the third set of skill-based games.

19. The method of claim 18, wherein the first set of games does not include any skill-based games.

20. The method of claim 11, wherein providing, by the processor, the first quantity of plays of the first set of games further comprises causing, by the processor, data associated with the first quantity of plays of the first set of games to be transmitted over a data network.

* * * * *